United States Patent
Tachi et al.

(10) Patent No.: US 11,843,883 B2
(45) Date of Patent: Dec. 12, 2023

(54) SOLID-STATE IMAGING DEVICE AND ELECTRONIC DEVICE

(71) Applicant: Sony Semiconductor Solutions Corporation, Kanagawa (JP)

(72) Inventors: Masayuki Tachi, Kanagawa (JP); Kazuhito Kobayashi, Kanagawa (JP); Daisuke Yoshioka, Kanagawa (JP); Shiro Omori, Kanagawa (JP); Takeshi Kozasa, Fukuoka (JP); Kazuhide Fujita, Kanagawa (JP); Naoto Hayashida, Kanagawa (JP); Shoyu Tanaka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/619,348

(22) PCT Filed: Jun. 18, 2020

(86) PCT No.: PCT/JP2020/023985
§ 371 (c)(1),
(2) Date: Dec. 15, 2021

(87) PCT Pub. No.: WO2020/262193
PCT Pub. Date: Dec. 30, 2020

(65) Prior Publication Data
US 2022/0345651 A1    Oct. 27, 2022

(30) Foreign Application Priority Data

Jun. 25, 2019  (JP) ................................. 2019-117530

(51) Int. Cl.
*H04N 25/704* (2023.01)
*H04N 25/44* (2023.01)
(Continued)

(52) U.S. Cl.
CPC .......... *H04N 25/704* (2023.01); *H04N 25/44* (2023.01); *H04N 25/46* (2023.01); *H04N 25/533* (2023.01); *H04N 25/583* (2023.01); *H04N 25/77* (2023.01)

(58) Field of Classification Search
CPC .. G02B 5/201; G02B 7/09; G02B 7/34; H01L 27/14605; H01L 27/14607;
(Continued)

(56) References Cited

U.S. PATENT DOCUMENTS

| 2015/0195463 | A1 | 7/2015 | Koh |
| 2020/0161352 | A1* | 5/2020 | Takahashi ............ H04N 25/134 |
| 2021/0105423 | A1* | 4/2021 | Miyakoshi ........... H04N 5/3696 |

FOREIGN PATENT DOCUMENTS

| EP | 3618430 A1 | 3/2020 |
| JP | 2011-250325 A | 12/2011 |

(Continued)

OTHER PUBLICATIONS

International Search Report (PCT/ISA/210), International Application No. PCT/JP2020/023985, dated Sep. 1, 2020.

*Primary Examiner* — Antoinette T Spinks
(74) *Attorney, Agent, or Firm* — Michael Best & Friedrich LLP

(57) ABSTRACT

The present disclosure relates to a solid-state imaging device that makes it possible to suppress deterioration of phase difference information, and an electronic device.

There is provided a solid-state imaging device including a pixel array unit in which a plurality of pixels is two-dimensionally arrayed. The plurality of pixels includes a phase difference pixel for phase difference detection, the pixel array unit has an array pattern in which pixel units including neighboring pixels of a same color are regularly arrayed, and the phase difference pixel is partially not added when horizontal/vertical addition is performed on a pixel (Continued)

signal of a predetermined pixel in a horizontal direction and a pixel signal of a predetermined pixel in a vertical direction, in reading the plurality of pixels. The present disclosure can be applied to, for example, a CMOS image sensor having a phase difference pixel.

20 Claims, 24 Drawing Sheets

(51) Int. Cl.
*H04N 25/46* (2023.01)
*H04N 25/77* (2023.01)
*H04N 25/533* (2023.01)
*H04N 25/583* (2023.01)

(58) Field of Classification Search
CPC ......... H01L 27/14621; H01L 27/14623; H01L 27/14627; H01L 27/14645; H01L 27/14641; H04N 5/232122; H04N 5/347; H04N 5/35554; H04N 5/35563; H04N 5/35572; H04N 5/35581; H04N 5/361; H04N 5/3696; H04N 5/36961; H04N 5/36963; H04N 5/37455; H04N 9/0455; H04N 9/04555; H04N 9/07; H04N 25/40; H04N 25/44; H04N 25/46; H04N 25/533; H04N 25/583; H04N 25/704; H04N 25/77; H04N 25/778; H04N 23/10; H04N 23/12; H04N 25/134; H04N 25/60; G03B 13/36

See application file for complete search history.

(56) References Cited

FOREIGN PATENT DOCUMENTS

| | | |
|---|---|---|
| JP | 2017-216647 A | 12/2017 |
| JP | 2018-067944 A | 4/2018 |
| JP | 2019-012968 A | 1/2019 |
| JP | 2019-029985 A | 2/2019 |
| WO | 2017/126326 A1 | 7/2017 |
| WO | WO-2018198766 A1 | 11/2018 |
| WO | WO-2019026718 A1 | 2/2019 |

* cited by examiner

FIG. 14

|  | Case0 | Case1 | Case2 | Case3 | Case4 | Case5 | Case6 |
|---|---|---|---|---|---|---|---|
| SEL1 | ○ | ○ | ○ | × | ○ | × | × |
| SEL2 | ○ | ○ | × | ○ | × | ○ | × |
| SEL3 | ○ | × | ○ | ○ | × | × | ○ |

SOLID-STATE IMAGING DEVICE AND ELECTRONIC DEVICE

TECHNICAL FIELD

The present disclosure relates to a solid-state imaging device and an electronic device, and more particularly to a solid-state imaging device that makes it possible to suppress deterioration of phase difference information, and an electronic device.

BACKGROUND ART

In recent years, in order to improve a speed of auto-focus, there has been used a solid-state imaging device in which pixels for phase difference detection (hereinafter, referred to as a phase difference pixel) are arranged.

As a configuration of this type of phase difference pixel, techniques disclosed in Patent Documents 1 and 2 are known.

CITATION LIST

Patent Document

Patent Document 1: Japanese Patent Application Laid-Open No. 2017-216647
Patent Document 2: Japanese Patent Application Laid-Open No. 2011-250325

SUMMARY OF THE INVENTION

Problems to be Solved by the Invention

Meanwhile, in a case of using a configuration in which phase difference pixels are included in a plurality of pixels two-dimensionally arrayed in a pixel array unit, it is required to suppress deterioration of phase difference information.

The present disclosure has been made in view of such a situation, and an object is to be able to suppress deterioration of phase difference information.

Solutions to Problems

A solid-state imaging device according to one aspect of the present disclosure is a solid-state imaging device including a pixel array unit in which a plurality of pixels is two-dimensionally arrayed. The plurality of pixels includes a phase difference pixel for phase difference detection, the pixel array unit has an array pattern in which pixel units including neighboring pixels of a same color are regularly arrayed, and the phase difference pixel is partially not added when horizontal/vertical addition is performed on a pixel signal of a predetermined pixel in a horizontal direction and a pixel signal of a predetermined pixel in a vertical direction, in reading the plurality of pixels.

An electronic device according to one aspect of the present disclosure is an electronic device equipped with a solid-state imaging device including a pixel array unit in which a plurality of pixels is two-dimensionally arrayed. The plurality of pixels includes a phase difference pixel for phase difference detection, the pixel array unit has an array pattern in which pixel units including neighboring pixels of a same color are regularly arrayed, and the phase difference pixel is partially not added when horizontal/vertical addition is performed on a pixel signal of a predetermined pixel in a horizontal direction and a pixel signal of a predetermined pixel in a vertical direction, in reading the plurality of pixels.

In a solid-state imaging device and an electronic device according to one aspect of the present disclosure, there is provided a pixel array unit in which a plurality of pixels is two-dimensionally arrayed. The plurality of pixels includes a phase difference pixel for phase difference detection, and the pixel array unit has an array pattern in which pixel units including neighboring pixels of a same color are regularly arrayed. Furthermore, the phase difference pixel is partially not added when horizontal/vertical addition is performed on a pixel signal of a predetermined pixel in a horizontal direction and a pixel signal of a predetermined pixel in a vertical direction, in reading the plurality of pixels.

A solid-state imaging device according to one aspect of the present disclosure is a solid-state imaging device including a pixel array unit in which a plurality of pixels is two-dimensionally arrayed. The plurality of pixels includes a phase difference pixel for phase difference detection, the pixel array unit has an array pattern in which pixel units including neighboring pixels of a same color are regularly arrayed, and there is provided, in a horizontal direction, a plurality of selection control lines to select connection to a vertical signal line from a floating diffusion region formed for every plurality of pixel units in a vertical direction.

In a solid-state imaging device according to one aspect of the present disclosure, there is provided a pixel array unit in which a plurality of pixels is two-dimensionally arrayed. The plurality of pixels includes a phase difference pixel for phase difference detection, and the pixel array unit has an array pattern in which pixel units including neighboring pixels of a same color are regularly arrayed. Furthermore, there is provided, in a horizontal direction, a plurality of selection control lines to select connection to a vertical signal line from a floating diffusion region formed for every plurality of pixel units in a vertical direction.

The solid-state imaging device or the electronic device according to one aspect of the present disclosure may be an independent device or an internal block constituting one device.

BRIEF DESCRIPTION OF DRAWINGS

FIG. 14 is a view illustrating correspondence between selection control lines and read drive.

MODE FOR CARRYING OUT THE INVENTION

Hereinafter, embodiments of the technology according to the present disclosure (present technology) will be described with reference to the drawings. Note that the description will be made in the following order.
1. First Embodiment
2. Second Embodiment
3. Modified example
4. Configuration of electronic device
5. Usage example of solid-state imaging device
6. Application example to mobile object
7. Application example to endoscopic surgery system

1. First Embodiment

Configuration Example of Solid-State Imaging Device

Figure 1:
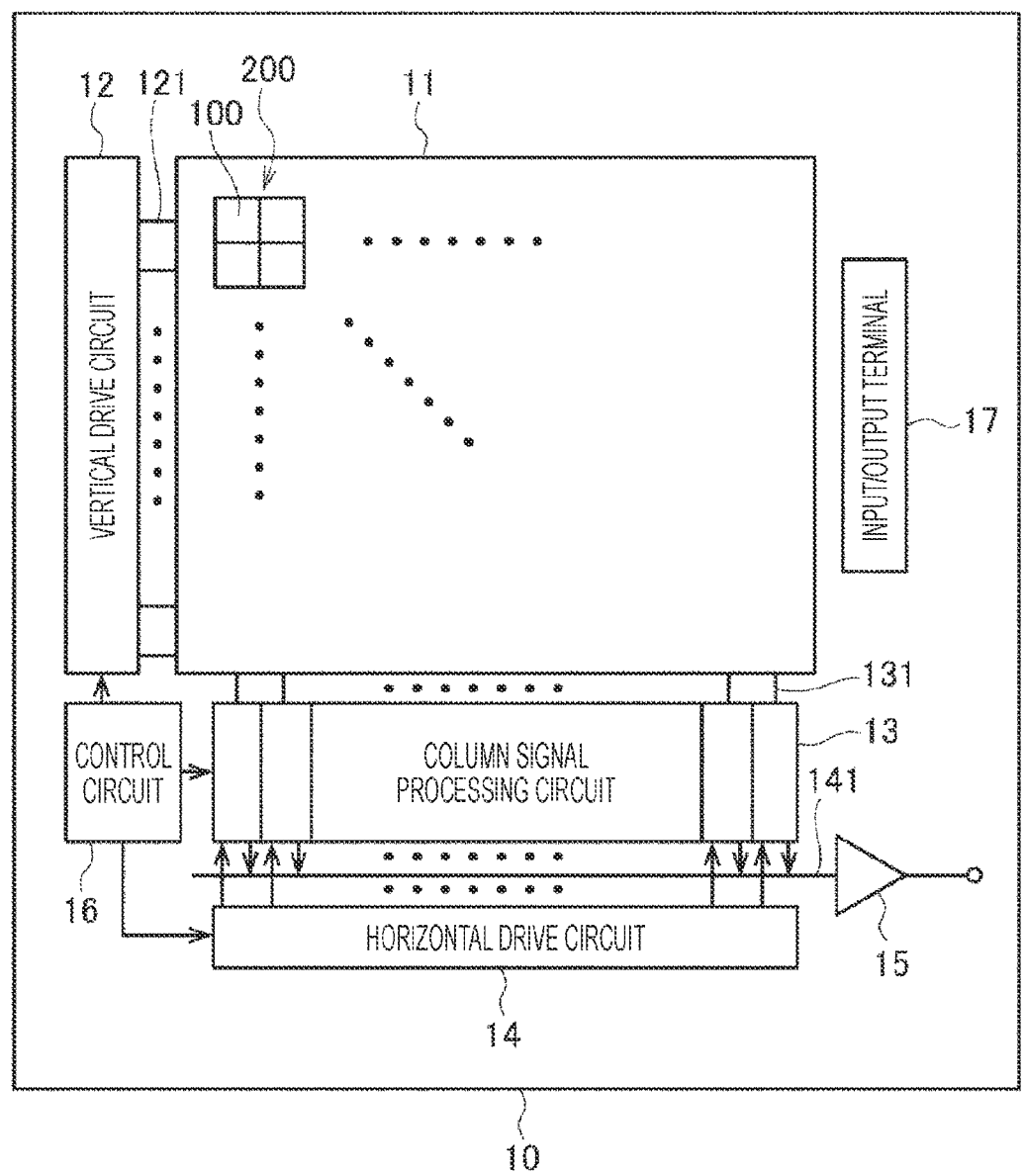
FIG. 1 is a block diagram illustrating an example of a configuration of a solid-state imaging device to which the technology according to the present disclosure is applied.

FIG. 1 is a block diagram illustrating a configuration example of an embodiment of a solid-state imaging device to which the technology according to the present disclosure is applied.

A solid-state imaging device 10 in FIG. 1 includes an image sensor such as a complementary metal oxide semiconductor (CMOS) image sensor. The solid-state imaging device 10 captures incident light (image light) from a subject via an optical lens system (not illustrated), converts a light amount of the incident light formed as an image on an imaging surface into an electrical signal in units of pixels, and outputs as a pixel signal.

In FIG. 1, the solid-state imaging device 10 includes a pixel array unit 11, a vertical drive circuit 12, a column signal processing circuit 13, a horizontal drive circuit 14, an output circuit 15, a control circuit 16, and an input/output terminal 17.

In the pixel array unit 11, a plurality of pixel units 200 is arrayed two-dimensionally (in a matrix). The pixel unit 200 includes four pixels 100 (four pixels of 2×2) of the same color.

Each pixel unit 200 includes, as the four pixels 100 of the same color, a red (R) pixel, a green (G) pixel, or a blue (B) pixel according to a color filter that transmits light of a wavelength of a red (R) component, a green (G) component, or a blue (B) component. Furthermore, the pixel unit 200 is configured as a sharing pixel in which a pixel circuit is shared by the four pixels 100 of the same color.

In the pixel unit 200, each pixel 100 of the same color includes a photodiode (PD) as a photoelectric conversion element, and a transfer transistor TR-Tr. Furthermore, in the pixel unit 200, a reset transistor RST-Tr, an amplification transistor AMP-Tr, and a selection transistor SEL-Tr as pixel circuits are shared by the four pixels 100 of the same color.

Note that, although details will be described later, in the pixel array unit 11, pixels for phase difference detection (hereinafter, referred to as phase difference pixels) are arranged to be scattered (in a repeated pattern) as the pixels 100 included in the pixel unit 200.

The vertical drive circuit 12 includes a shift register and the like, selects a predetermined pixel drive line 121 to supply a drive signal (pulse) for driving the pixel 100 or the pixel unit 200 to the selected pixel drive line 121, and drives the pixel 100 or the pixel unit 200 in units of rows.

That is, the vertical drive circuit 12 selectively scans each pixel 100 or each pixel unit 200 of the pixel array unit 11 sequentially in a vertical direction in units of rows, and supplies a pixel signal based on a charge (signal charge) generated in accordance with an amount of received light in the photodiode of each pixel 100, to the column signal processing circuit 13 through a vertical signal line 131.

The column signal processing circuit 13 is arranged for each column of the pixel units 200, and performs, for every pixel column, signal processing such as noise removal on signals outputted from the pixel units 200 of one row. For example, the column signal processing circuit 13 performs signal processing such as correlated double sampling (CDS) for removing pixel-specific fixed pattern noise, and analog digital (AD) conversion.

The horizontal drive circuit 14 includes a shift register and the like, sequentially selects each of the column signal processing circuits 13 by sequentially outputting horizontal scanning pulses, and causes each of the column signal processing circuits 13 to output a pixel signal to a horizontal signal line 141.

The output circuit 15 performs signal processing on signals sequentially supplied from each of the column signal processing circuits 13 through the horizontal signal line 141, and outputs the signals. Note that, in the output circuit 15, for example, there is a case where only buffering is performed, or a case where black level adjustment, column variation correction, various kinds of digital signal processing, and the like are performed.

The control circuit 16 controls an operation of each unit of the solid-state imaging device 10.

Furthermore, the control circuit 16 generates a clock signal and a control signal serving as references of operations of the vertical drive circuit 12, the column signal processing circuit 13, the horizontal drive circuit 14, and the like, on the basis of a vertical synchronization signal, a horizontal synchronization signal, and a master clock signal. The control circuit 16 outputs the generated clock signal and control signal to the vertical drive circuit 12, the column signal processing circuit 13, the horizontal drive circuit 14, and the like.

The input/output terminal 17 exchanges signals with the outside.

The solid-state imaging device 10 in FIG. 1 configured as described above is a CMOS image sensor called a column AD system in which the column signal processing circuits 13 that perform CDS processing and AD conversion processing are arranged for every pixel column. Furthermore, the solid-state imaging device 10 in FIG. 1 can be a back-illuminated CMOS image sensor or the like.

(Plane Layout of Pixels)

Figure 2:
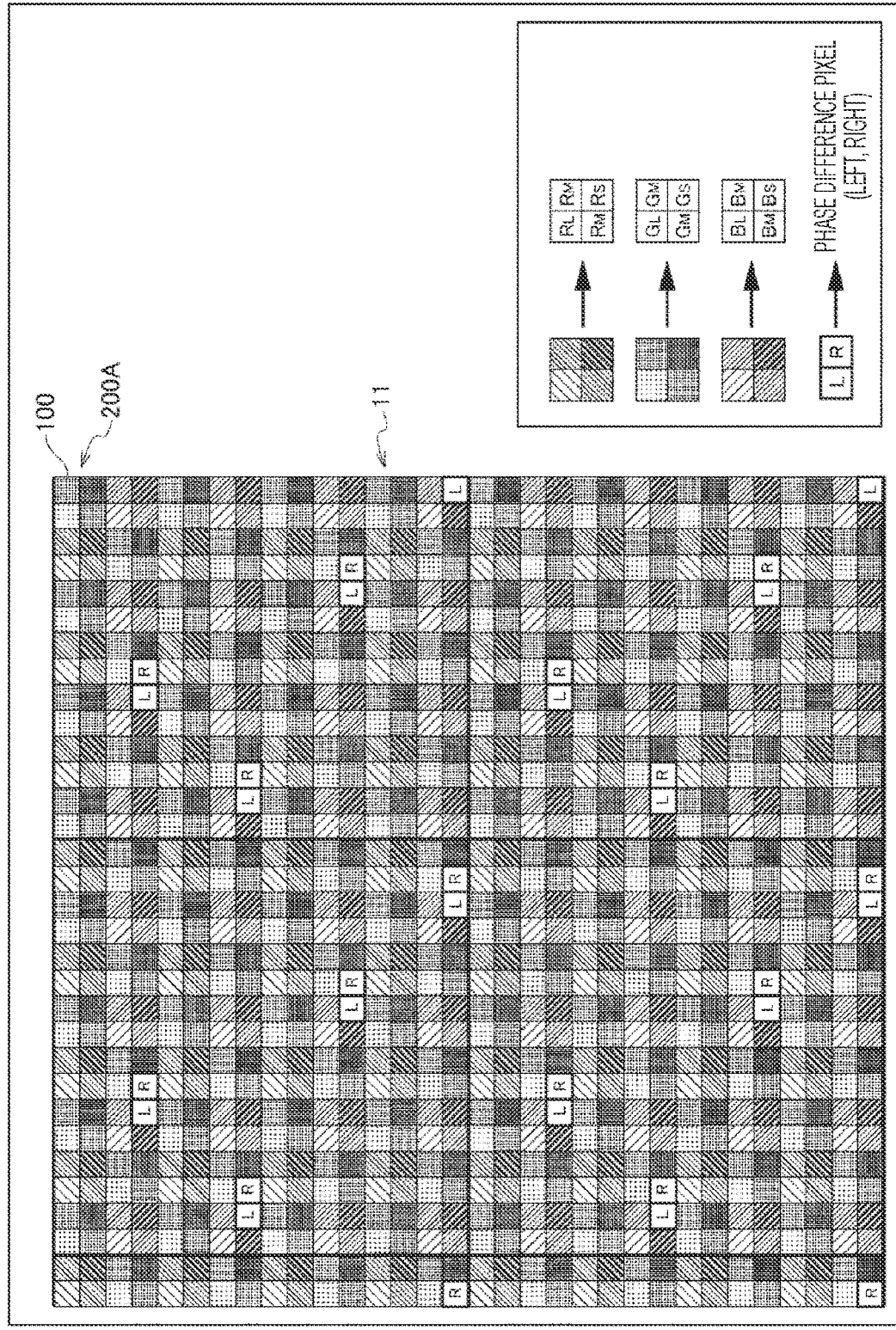
FIG. 2 is a view illustrating a plane layout of a plurality of pixels arrayed in a pixel array unit.

FIG. 2 exemplifies the pixels 100 of 32 rows and 32 columns arrayed in a predetermined region when viewed from a light incident side, among the plurality of pixels 100 arrayed two-dimensionally in the pixel array unit 11 of FIG. 1.

In the following description, an R pixel 100 refers to a pixel in which a color filter that transmits light having a wavelength of the red (R) component is provided as the color filter, and a charge corresponding to light of the red (R) component is obtained from light transmitted through the R color filter. The R pixel 100 is given with a pattern of right-upward diagonal line, and four adjacent pixels constitute an R pixel unit 200A.

Furthermore, as illustrated in a lower right frame in the figure, in the R pixel unit 200A, an exposure time is adjusted for every four R pixels 100. Here, the exposure time is adjusted in three stages of T1, T2, and T3 (T1>T2>T3), where T1 is a long accumulation exposure time, T2 is a medium accumulation exposure time, and T3 is a short accumulation exposure time.

In the R pixel unit 200A, among the four pixels, the upper left is a long accumulation $R_L$ pixel 100, the upper right and lower left are medium accumulation $R_M$ pixels 100, and the lower right is a short accumulation $R_S$ pixel 100.

Furthermore, as a G pixel 100 refers to a pixel in which a charge corresponding to light of the green (G) component is obtained from light transmitted through a color filter that transmits light of a wavelength of the green (G) component. The G pixel 100 is given with a dot pattern, and four adjacent pixels constitute a G pixel unit 200A.

In the G pixel unit 200A, similarly to the R pixel unit 200A, an exposure time is adjusted in three stages. Among the four pixels, the upper left is a long accumulation $G_L$ pixel 100, the upper right and lower left are medium accumulation $G_M$ pixels 100, and the lower right is a short accumulation $G_S$ pixel 100.

Moreover, a B pixel 100 refers to a pixel in which a charge corresponding to light of the blue (B) component is obtained from light transmitted through a color filter that transmits light of a wavelength of the blue (B) component. The B pixel 100 is given with a pattern of right-downward diagonal line, and four adjacent pixels constitute a B pixel unit 200A.

In the B pixel unit 200A, similarly to the R pixel unit 200A, an exposure time is adjusted in three stages. Among the four pixels, the upper left is a long accumulation $B_L$ pixel 100, the upper right and lower left are medium accumulation $B_M$ pixels 100, and the lower right is a short accumulation $B_S$ pixel 100.

Here, in the pixel array unit 11 of FIG. 2, when attention is paid to the R pixel unit 200A, the G pixel unit 200A, and the B pixel unit 200A, these pixel units 200A are regularly arrayed and form a Bayer array.

In other words, here, it can also be said that each of the pixels in the Bayer array is divided into 2×2 pixels and includes four pixels of the same color. Note that the Bayer array is an array pattern in which the G pixels are arranged in a checkered pattern, and the R pixels and the B pixels are alternately arranged in every one row in a remaining portion.

Furthermore, in the pixel array unit 11 of FIG. 2, a set of a phase difference pixel 100L and a phase difference pixel 100R is arranged in accordance with a predetermined rule.

Here, a structure (2×1 OCL structure) is obtained in which one on-chip lens (OCL) is provided for two pixels (2×1 pixels) on the left and right in a horizontal direction as the set of the phase difference pixels 100L and 100R. That is, a structure is obtained in which a plurality of photoelectric conversion elements such as photodiodes is embedded in one on-chip lens. Hereinafter, a pixel having a 2×1 OCL structure is also referred to as a 2×1 OCL pixels.

At this time, since the four pixels constituting the R, G, and B pixel units 200A have different exposure times of two pixels arranged in the horizontal direction, it is difficult to provide one on-chip lens for these two pixels (2×1 pixels) due to characteristics of the phase difference pixels.

Therefore, here, an on-chip lens is arranged across the pixel units 200A adjacent to each other on the left and right, and the pixels 100 adjacent to each other on the left and right including any one of the two photoelectric conversion elements formed for the on-chip lens have color filters of the same color and have the same exposure time. Using such a structure makes it possible to provide one on-chip lens for two pixels (2×1 pixels) in the horizontal direction.

For example, in the adjacent B pixel unit 200A and G pixel unit 200A, in providing one on-chip lens for a photoelectric conversion element of the lower right $B_S$ pixel 100 of the B pixel unit 200A and a photoelectric conversion element of the lower left $G_M$ pixel 100 of the G pixel unit 200A, the following structure is obtained.

That is, at a time of manufacture, a color filter of the lower right $B_S$ pixel 100 of the B pixel unit 200A is configured as the G pixel 100 as a G color filter instead of a B color filter. Furthermore, the $B_S$ pixel 100 is a short accumulation pixel (S), but the exposure time is changed to an exposure time of medium accumulation to obtain a medium accumulation pixel (M).

As a result, one on-chip lens is provided for the adjacent lower right $G_M$ pixel 100 of the B pixel unit 200A and lower left $G_M$ pixel 100 of the G pixel unit 200A, and these $G_M$ pixels 100 adjacent in the horizontal direction have the same G color filter and have the same exposure time of medium accumulation.

Therefore, the lower right $G_M$ pixel 100 of the B pixel unit 200A is configured as the phase difference pixel 100L, and the lower left $G_M$ pixel 100 of the G pixel unit 200A is configured as the phase difference pixel 100R, and a phase difference between two images can be detected on the basis of a pixel signal obtained from the set of the phase difference pixels 100L and 100R.

Note that, in the B pixel unit 200A including the phase difference pixel 100L, when the lower right $B_S$ pixel 100 is changed to the $G_M$ pixel 100, there will be no short accumulation pixel (S). However, by changing the lower left $B_M$ pixel 100 to the $B_S$ pixel 100, the four pixels are to include a short accumulation pixel (S) together with a long accumulation pixel (L) and a medium accumulation pixel (M).

In this manner, in the pixel array unit 11 of FIG. 2, sets of the phase difference pixels 100L and the phase difference pixels 100R included in adjacent B pixel units 200A and G pixel units 200A are regularly arrayed at predetermined pixel intervals in the horizontal direction and the vertical direction.

(Three-Exposure HDR/H2V2 Addition Method)

Figure 3:
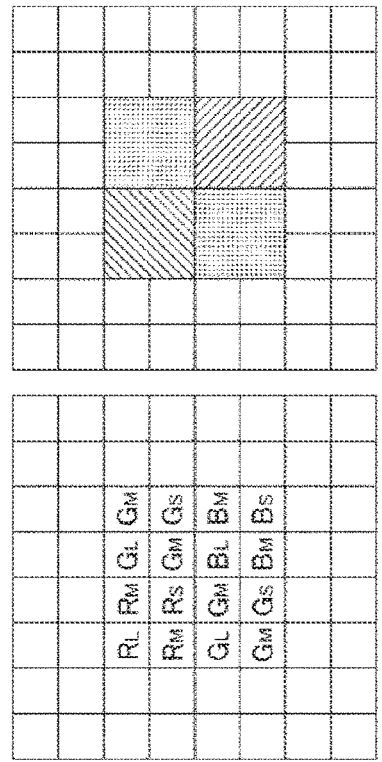
FIG. 3 is a view illustrating an example of read drive in a three-exposure HDR/H2V2 addition method.

FIG. 3 schematically illustrates a case where a three-exposure HDR/H2V2 addition method is performed as read drive of the pixel unit 200A arranged in the Bayer array in the pixel array unit 11 of FIG. 2.

In a case where the three-exposure HDR/H2V2 addition method is used, first, the H2V2 addition is performed. In the H2V2 addition, pixel signals from the pixels 100 of the same color and the same exposure are added (H2V2 addition) in two pixels in the horizontal direction and two pixels in the vertical direction (A of FIG. 3).

Specifically, an added signal is obtained by adding pixel signals of the upper left $R_L$ pixels 100 of the R pixel unit 200A for four pixels and adding pixel signals of the four $R_L$ pixels 100 according to a black circle at a vertex for every four rectangular frames 301R in A of FIG. 3 (B of FIG. 3).

Similarly, by performing the H2V2 addition on the remaining three pixels of the R pixel unit 200A, the four pixels of the G pixel unit 200A, and the four pixels of the B pixel unit 200A, an added signal is obtained for the pixels 100 of the same color and the same exposure (B of FIG. 3).

Then, subsequently to the H2V2 addition, three-exposure HDR is performed. That is, since the pixel signals obtained by the H2V2 addition (analog addition) include pixel signals from the long accumulation pixel (L), the medium accumulation pixel (M), and the short accumulation pixel (S) for every color of R, G, and B, pixel signals having different exposure times are selected or combined to obtain a high dynamic range (HDR) pixel signal (C of FIG. 3) in the three-exposure HDR.

This three-exposure HDR is a technique of expanding a dynamic range by arranging three types of pixels having different exposure times in pixels of the same color and selecting or combining signals of appropriate exposure from the three types of pixels.

Furthermore, in the pixel array of FIG. 2, phase difference detection is performed by forming one on-chip lens across the B pixel unit 200A and the G pixel unit 200A and arranging the set of the phase difference pixels 100L and 100R.

Figure 4:
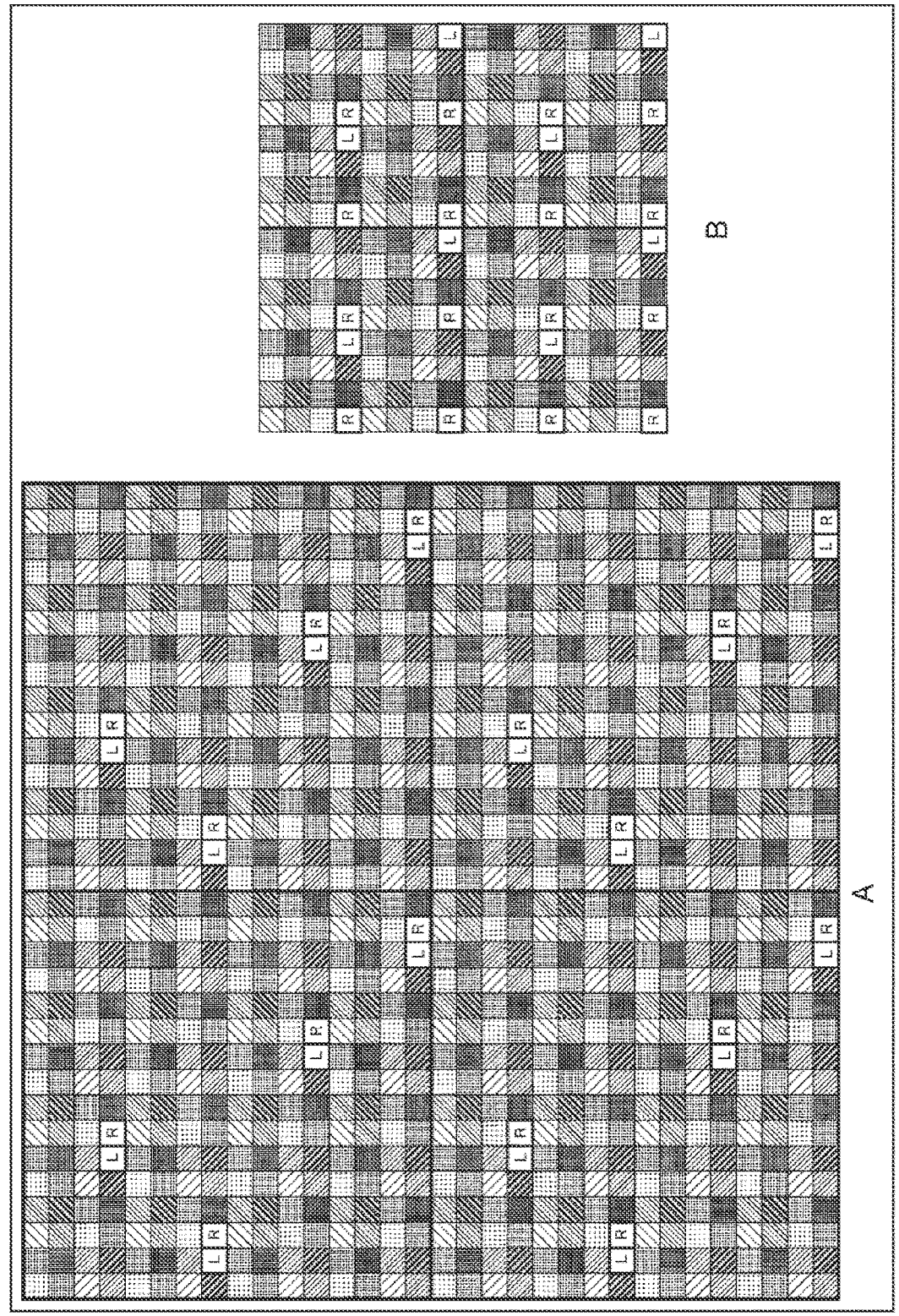
FIG. 4 is a view schematically representing a state when H2V2 addition is uniformly performed in the entire region.

Here, in performing the H2V2 addition on the nearest pixels 100 of the same color and the same exposure for this pixel array, when a case is assumed in which all the regions are uniformly added, many normal pixels are added to the phase difference pixels (A of FIG. 4).

Therefore, a pixel array schematically representing a state after the H2V2 addition in B of FIG. 4 is obtained, and a density of the phase difference pixels 100L and 100R in the pixels included in (the entire region of) the pixel array is increased as compared with a pixel array schematically representing a state before the H2V2 addition in A of FIG. 4. Whereas, since signals of the normal pixel and the phase difference pixel are mixed, it is difficult to detect the phase difference.

Figure 5:
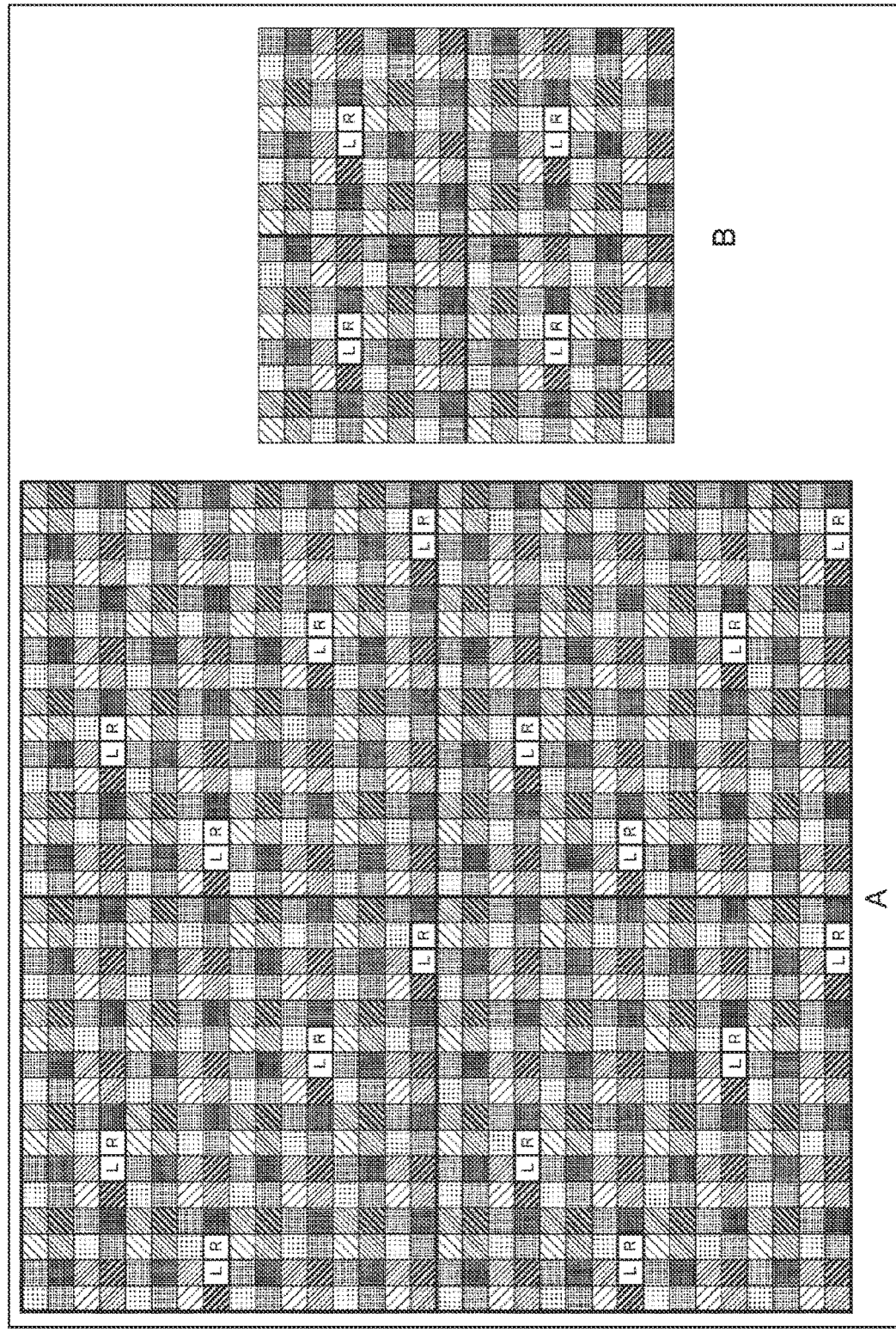
FIG. 5 is a view schematically representing a state in which phase difference pixels are thinned out in performing the H2V2 addition.

Therefore, in the technology according to the present disclosure, by thinning out the phase difference pixels 100L and 100R in performing horizontal and vertical addition (H2V2 addition), and setting a density of the phase difference pixels after the horizontal/vertical addition to be a density that is same as or similar to or smaller than a density of the phase difference pixels before the horizontal/vertical addition, the density of the phase difference pixels 100L and 100R is prevented from becoming too high (B of FIG. 5).

That is, in performing the H2V2 addition illustrated in A of FIG. 3, in a case where at least one of the four selected pixels includes a phase difference pixel, only the phase difference pixel is selected and added in some pixels, or only the normal pixels excluding the phase difference pixels are selected and added in other pixels.

This configuration makes it possible to adjust the density of the phase difference pixels and prevent deterioration of the phase difference signal. Furthermore, by controlling the density of the phase difference pixels before and after the horizontal/vertical addition so as to be the same or similar density, a same signal processing pipeline can be made common.

Here, an addition method of three patterns will be exemplified.

A first pattern is a pattern in which phase difference pixels (2×1 OCL pixels) are left at the time of the H2V2 addition. Here, in order to leave the phase difference pixels, pixel signals of other normal pixels (normal pixels of 12 pixels) are excluded so as not to be transferred to the vertical signal line 131 (not to be VSL-transferred).

Hereinafter, in control of the addition method of the first pattern, among the four pixel units 200A of the same color to be subjected to the H2V2 addition, three pixel units 200A (normal pixels of 12 pixels) excluding the pixel unit 200A including the phase difference pixel are not VSL-transferred and are not added, and thus are referred to as "non-addition pixel units".

A second pattern is a pattern in which phase difference pixels (2×1 OCL pixels) are discarded at the time of the H2V2 addition. That is, the density of the phase difference pixels is appropriately excluded due to restrictions on a correction circuit of the phase difference pixels with respect to a RAW pixel.

In this case, the pixel unit 200A including the phase difference pixel and the pixel unit 200A that is present diagonally are excluded by not performing VSL transfer. Here, the former pixel unit 200A includes the phase difference pixel and thus is referred to as a "pixel unit of phase difference pixel discarding", and the diagonal pixel unit 200A is referred to as a "companion pixel unit".

Note that the reason for excluding the pixel unit 200A that is present diagonally to the pixel unit 200A including the phase difference pixel, that is, the "companion pixel unit" diagonal to the "pixel unit of phase difference pixel discarding", is to align barycenters of pixels after the H2V2 addition.

A third pattern is a pattern in which the four pixel units 200A (normal pixels of 16 pixels) are added. That is, here, since the normal H2V2 addition is performed, normal pixels of 16 pixels are VSL-transferred.

In order to control on/off of the VSL transfer of the three patterns described above, a selection control line (SEL line) for control of connection between the vertical signal line 131 and a floating diffusion region (FD) is made into multiple lines, and drive control is performed.

Figure 6:
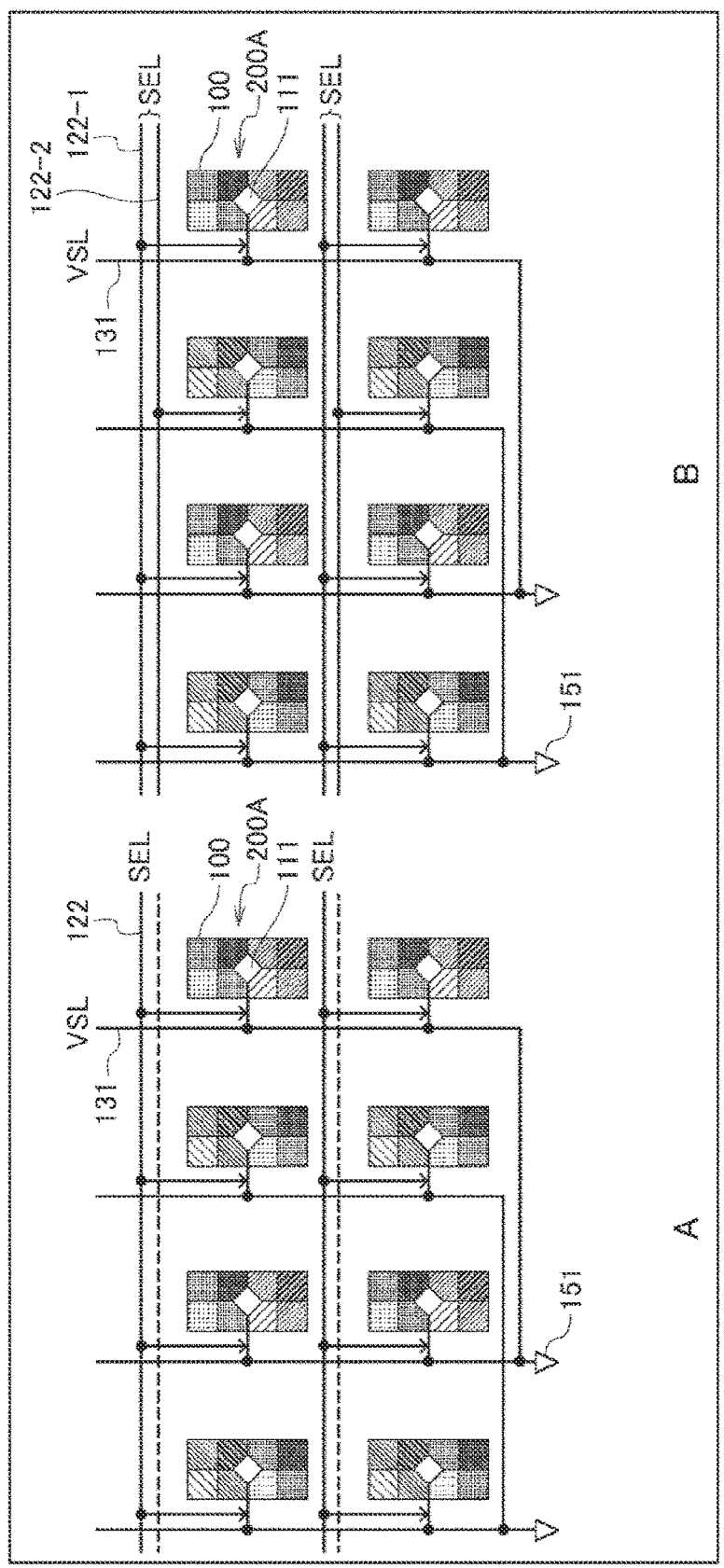
FIG. 6 is a view illustrating an example of a configuration in which a selection control line is made into multiple lines.

Specifically, as illustrated in FIG. 6, by making one selection control line (SEL) 122 (A of FIG. 6) for control of connection between the vertical signal line (VSL) 131 and a floating diffusion region (FD) 111 into two selection control lines (SEL) 122-1 and 122-2 (B of FIG. 6) as multiple lines, on/off of the VSL transfer according to the three patterns described above is controlled.

Note that the selection control line 122-1 and 122-2 are included in the pixel drive line 121 (FIG. 1), and a drive signal from the vertical drive circuit 12 or the control circuit 16, or from an external control device (not illustrated) is applied. Then, a selection transistor SEL-Tr connected to the selection control line 122-1 and 122-2 operates in accordance with the drive signal, which controls on/off of the VSL transfer.

Figure 7:
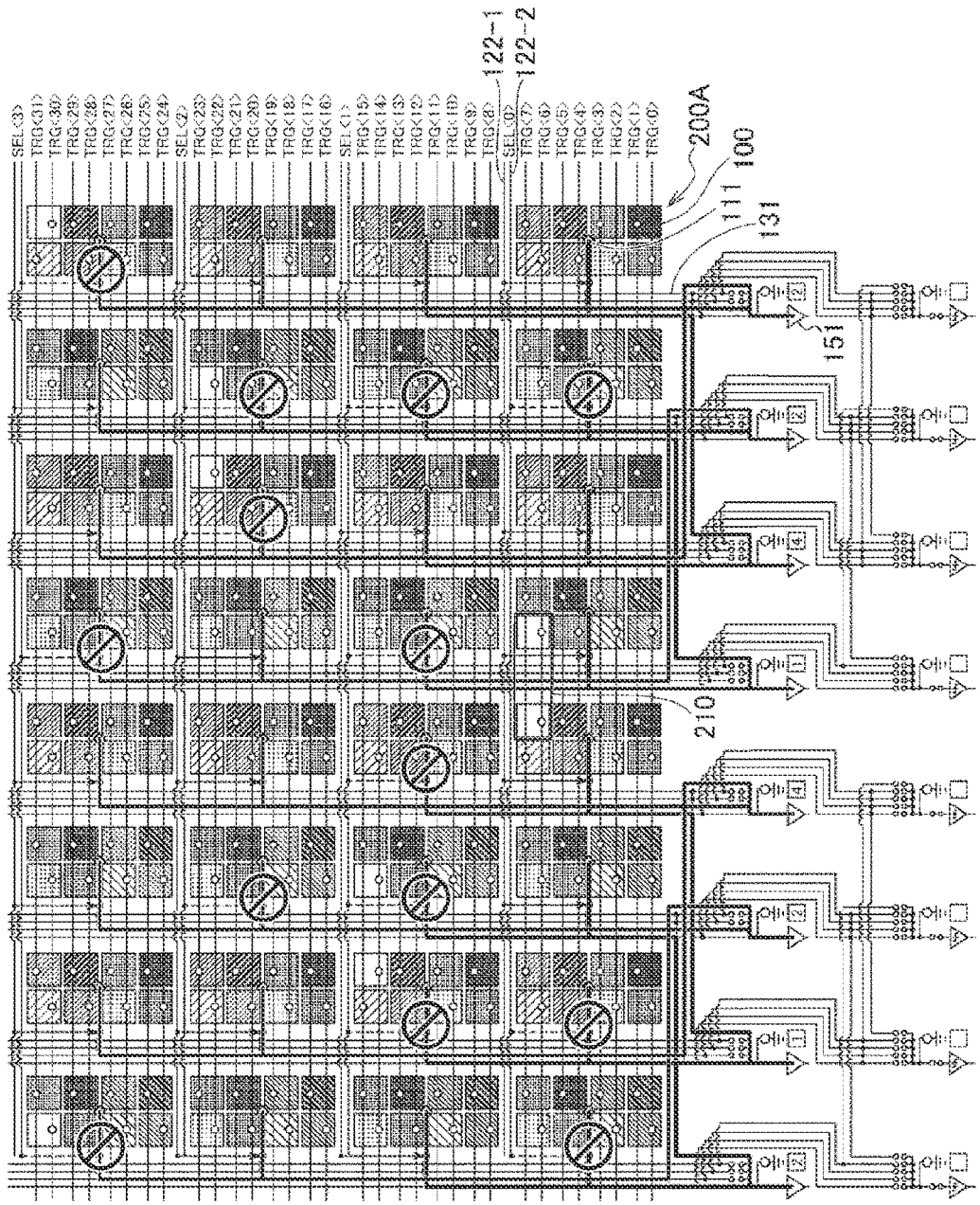
FIG. 7 is a view illustrating an example of drive control using two selection control lines in the three-exposure HDR/H2V2 addition method.

Specifically, in performing the H2V2 addition, as illustrated in FIG. 7, it is assumed a case where a set of phase difference pixels (100L, 100R) surrounded by a frame 210 is left and other phase difference pixels (2×1 OCL pixels) are discarded among the phase difference pixels (2×1 OCL pixels) represented by white squares in the figure.

In this case, by controlling driving of the selection control line 122-1 and 122-2 so that VSL transfer at a position denoted by a symbol (symbol hatched in circle) in the figure is turned off, it is possible to leave only the phase difference pixels in the frame 210.

Figure 8:
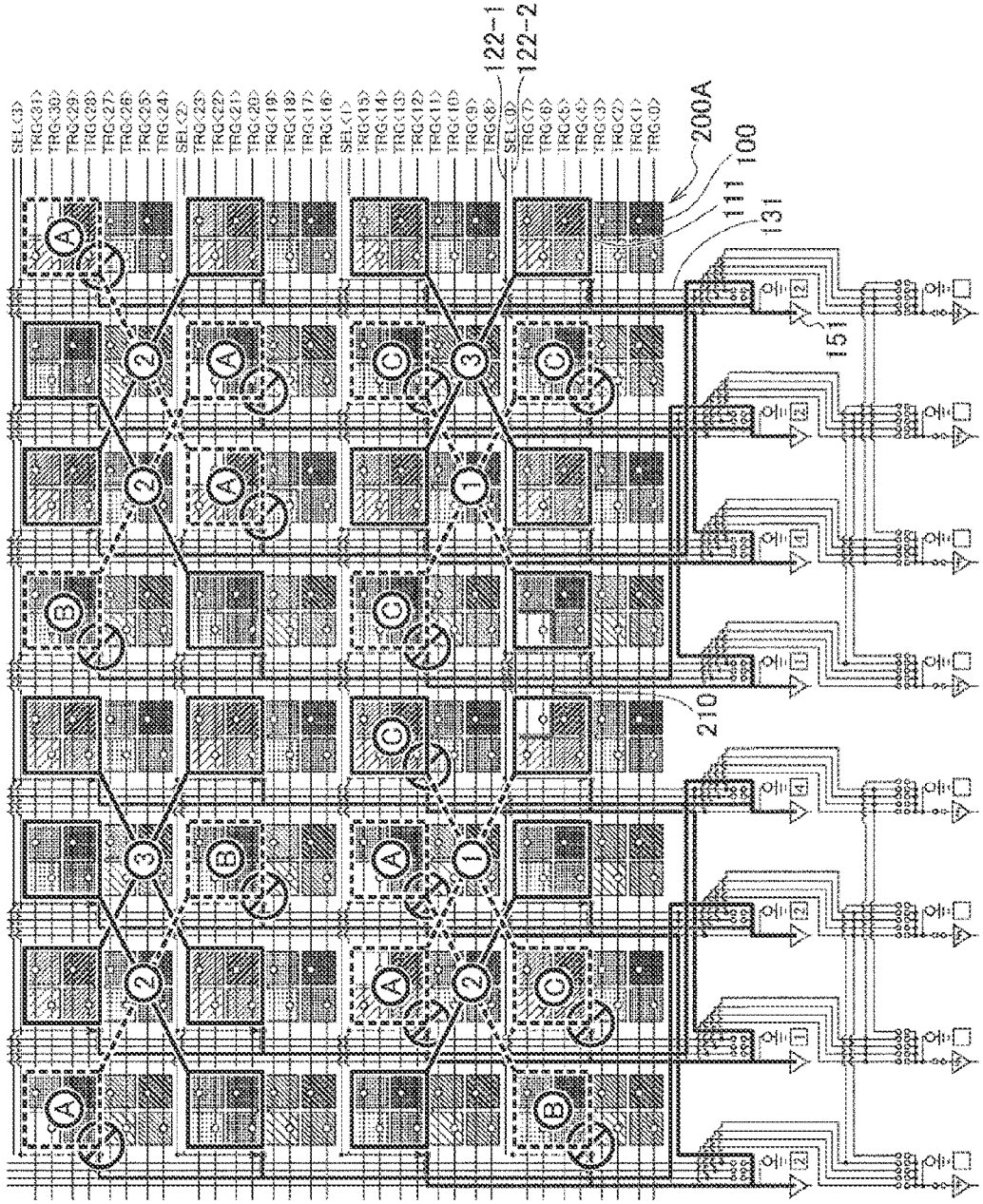
FIG. 8 is a view illustrating an example of drive control using two selection control lines in the three-exposure HDR/H2V2 addition method.

That is, as illustrated in FIG. 8, "1" in the figure represents that control of the addition method of the first pattern is performed, and VSL transfer and addition are not performed on the three pixel units 200A (normal pixels of 12 pixels) in which the phase difference pixels in the frame 210 are left but the pixel unit 200A including the phase difference pixels is excluded. That is, "C" in the figure is a "non-addition pixel unit".

Note that the phase difference pixel here is selected in units of pixels by drive control of the selection control line 112-1 and 112-2. Furthermore, in FIGS. 7 and 8, a drive signal is applied to a transfer control line (TRG line), and the pixel 100 in the pixel unit 200A is selected.

Furthermore, in FIG. 8, "2" in the figure represents that control of the addition method of the second pattern is performed, and the pixel unit 200A including the phase difference pixel is not read, and further, the pixel unit 200A located diagonally is also not read. That is, "A" in the figure is the "pixel unit of phase difference pixel discarding", "B" in the figure is the "companion pixel unit", and both of these pixel units are not added.

Moreover, in FIG. 8, "3" in the figure represents that control of the addition method of the third pattern is performed, and the normal H2V2 addition is performed on the four pixel units 200A (normal pixels of 16 pixels).

As described above, by making the selection control line (SEL line) into multiple lines to control on/off of the VSL transfer, and realizing the control of the addition methods of the first pattern to the third pattern, it is possible to prevent addition of the phase difference pixel and the normal pixel while reducing the density of the phase difference pixel.

Furthermore, in the technology according to the present disclosure, by preparing two selection control lines (SEL lines), changing connection of the selection control line for every floating diffusion region (FD) 111, and controlling a drive signal applied to the selection control line 122-1 and 122-2, averaging of signal levels on the vertical signal line (VSL) 131 is avoided. Note that, normally, the number of selection control lines is one, and two floating diffusion regions (FDs) 111 are connected to the same vertical signal line (VSL) 131 in the vertical direction, so that signal levels are averaged in the vertical signal line (VSL) 131.

Note that, here, the configuration equipped with two rows of AD converters including a comparator 151 has been exemplified. However, even in a case where other configurations are used, by applying similar concepts, high phase difference detection performance and image quality can be achieved at the time of the H2V2 addition in the case of using the three-exposure HDR/H2V2 addition method.

Here, in achieving driving with low power consumption, it is desirable to satisfy three requirements in terms of implementation.

A first requirement is that an existing defective pixel circuit currently used is applicable. That is, in a case where the first requirement cannot be satisfied, it is necessary to newly implement a countermeasure circuit on an existing defective pixel circuit, which leads to an increase in circuit scale or a decrease in yield.

In this regard, in the technology according to the present disclosure, a density of the phase difference pixels 100L and 100R (a density of 2×1 OCL pixels) is reduced by controlling drive signals applied to the two selection control lines in the H2V2 addition. Therefore, an existing defective pixel circuit is applicable, and the first requirement is satisfied.

A second requirement is that it is possible to perform phase detection auto focus (PDAF) while leaving the necessary phase difference pixels 100L and 100R (2×1 OCL pixels) alone.

In this regard, in the technology according to the present disclosure, by controlling drive signals to be applied to two selection control lines and selecting addition pixels, the phase difference pixels 100L and 100R (2×1 OCL pixels) to be used in the phase detection AF are left as independent pixels without being added, and a plurality of other peripheral pixels can be added, which satisfies the second requirement.

A third requirement is that barycentric positions match after analog addition.

In this regard, in the technology according to the present disclosure, while read drive with lower power consumption is achieved by pixel addition with the H2V2 addition, barycenter deviation correction in the addition pixel can be incorporated in the driving by controlling drive signals to be applied to the two selection control lines and selecting addition pixels such that barycenters are aligned after the addition (the "companion pixel unit" or the like with respect to the "pixel unit of phase difference pixel discarding"), which satisfies the third requirement.

As described above, while there is normally one selection control line, in the technology according to the present disclosure, by preparing two selection control lines and introducing a controllable physical specification (changing of contact to the selection control line) for every floating diffusion region (FD), the phase difference pixel correction, the phase difference detection, and the barycenter correction are simultaneously solved.

2. Second Embodiment (Neighboring-Adjacent Four-Pixel Addition/H2V2 Addition Method)

Figure 9:
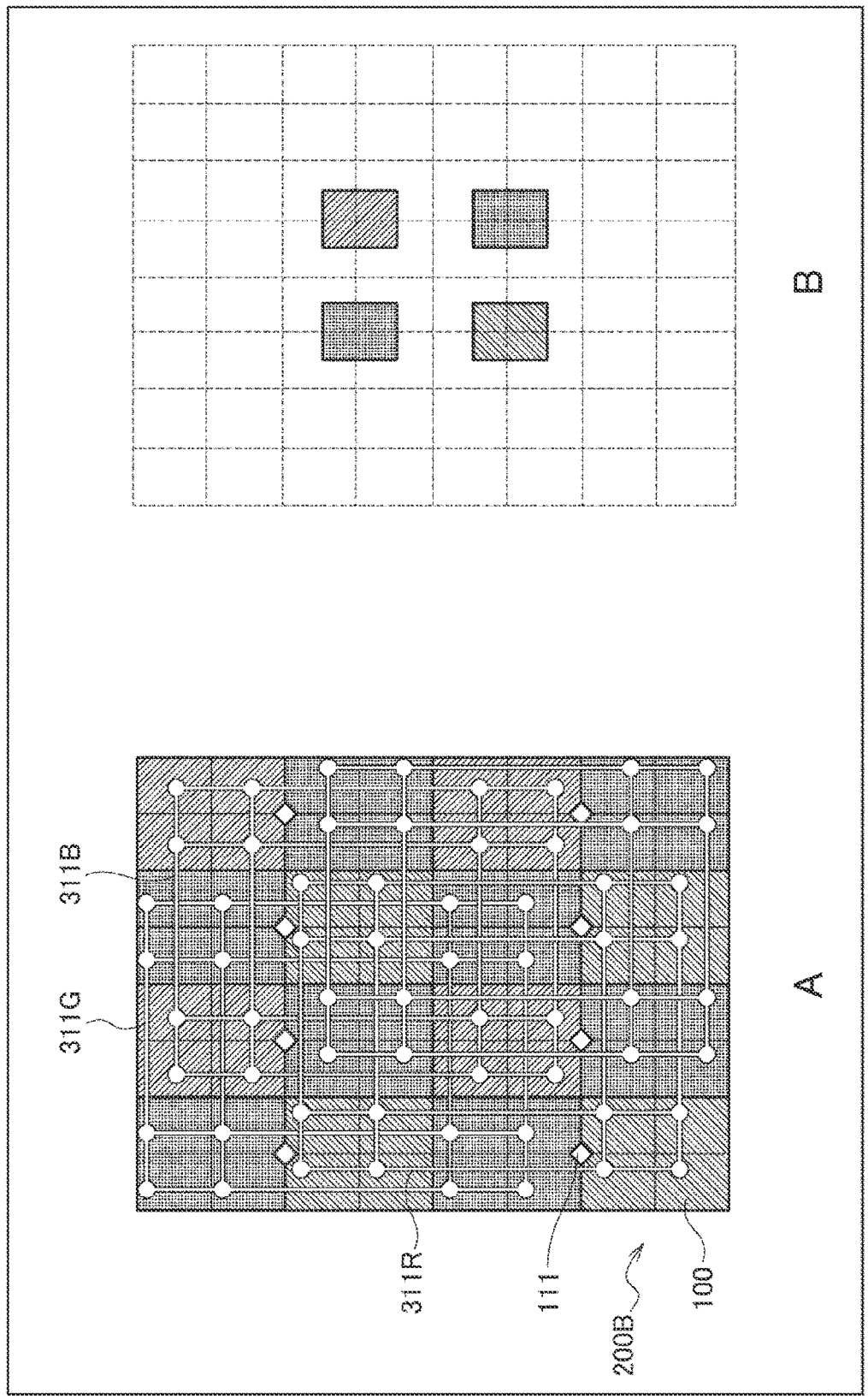
FIG. 9 is a view illustrating an example of read drive in a neighboring-adjacent four-pixel addition/H2V2 addition method.

FIG. 9 illustrates a case where a neighboring-adjacent four-pixel addition/H2V2 addition method is performed as read drive of a pixel unit 200B arranged in a Bayer array in a pixel array unit 11. However, in four pixels in each pixel unit 200B in the pixel array unit 11, that is, in all pixels 100 of the same color, an exposure time is the same time (exposure time of medium accumulation or the like).

In a case where this neighboring-adjacent four-pixel addition/H2V2 addition method is used, first, neighboring-adjacent four-pixel addition is performed. In the neighboring-adjacent four-pixel addition, four pixels (sharing pixels) constituting R, G, and B pixel units 200B are defined as neighboring-adjacent four pixels, and pixel signals from the four pixels are added (FD addition) in a floating diffusion region 111 to generate respective added signals of an R component, a G component, and a B component.

Then, the H2V2 addition is performed following the neighboring-adjacent four-pixel addition. In the H2V2 addition, added signals from the pixel units 200B of the same color are further added in two pixels in the horizontal direction and two pixels in the vertical direction.

Specifically, in the R pixel unit 200B, four R pixels 100 corresponding to four white circles at four corners of a lattice 311R in A of FIG. 9 are set as neighboring-adjacent four pixels, and pixel addition (analog addition) is performed. Furthermore, by the H2V2 addition, added signals obtained in neighboring-adjacent four pixels near the four corners of the lattice 311R in A of FIG. 9 are further added (analog addition) in the horizontal direction and the vertical direction. As a result, an added signal of the R component is obtained (an added signal at the lower left of B of FIG. 9).

Similarly, in the G pixel unit 200B, the neighboring-adjacent four-pixel addition and the H2V2 addition are performed in accordance with white circles of a lattice 311G in A of FIG. 9, and an added signal of the G component is obtained (an added signal at the upper left or the lower right of B of FIG. 9). Furthermore, in the B pixel unit 200B, the neighboring-adjacent four-pixel addition and the H2V2 addition are performed in accordance with white circles of a lattice 311B in A of FIG. 9, and an added signal of the B component is obtained (an added signal at the upper right of B of FIG. 9).

Here, also in the pixel array of FIG. 9, phase difference detection is performed by forming one on-chip lens across the B pixel unit 200B and the G pixel unit 200B and arranging a set of the phase difference pixels 100L and 100R.

In performing the H2V2 addition on the nearest pixel units 200B of the same color for this pixel array, when a case is assumed in which all the regions are uniformly added, many normal pixels are added to the phase difference pixels. Therefore, after the H2V2 addition, the density of the phase difference pixels 100L and 100R in the pixels included in (the entire region of) the pixel array increases. Whereas, since signals of the normal pixel and the phase difference pixel are mixed, it is difficult to detect the phase difference.

Therefore, in the neighboring-adjacent four-pixel addition/H2V2 addition method, similarly to the three-exposure HDR/H2V2 addition method described above, in performing the H2V2 addition, the phase difference pixels 100L and 100R are thinned out so that the density of the phase difference pixels 100L and 100R does not become too high.

That is, in performing the H2V2 addition illustrated in A of FIG. 9, in a case where at least one of the four selected pixels includes a phase difference pixel, only the phase difference pixel is selected and added in some pixels, or only the normal pixels excluding the phase difference pixels are selected and added in other pixels. This configuration makes it possible to adjust the density of the phase difference pixels and prevent deterioration of the phase difference signal.

Furthermore, in the neighboring-adjacent four-pixel addition/H2V2 addition method, similarly to the three-exposure HDR/H2V2 addition method described above, the selection control line 122 for control of connection between a vertical signal line (VSL) 131 and the floating diffusion region (FD) 111 is made into multiple lines in order to control on/off of the VSL transfer in three patterns of the first pattern to the third pattern.

Figure 10:
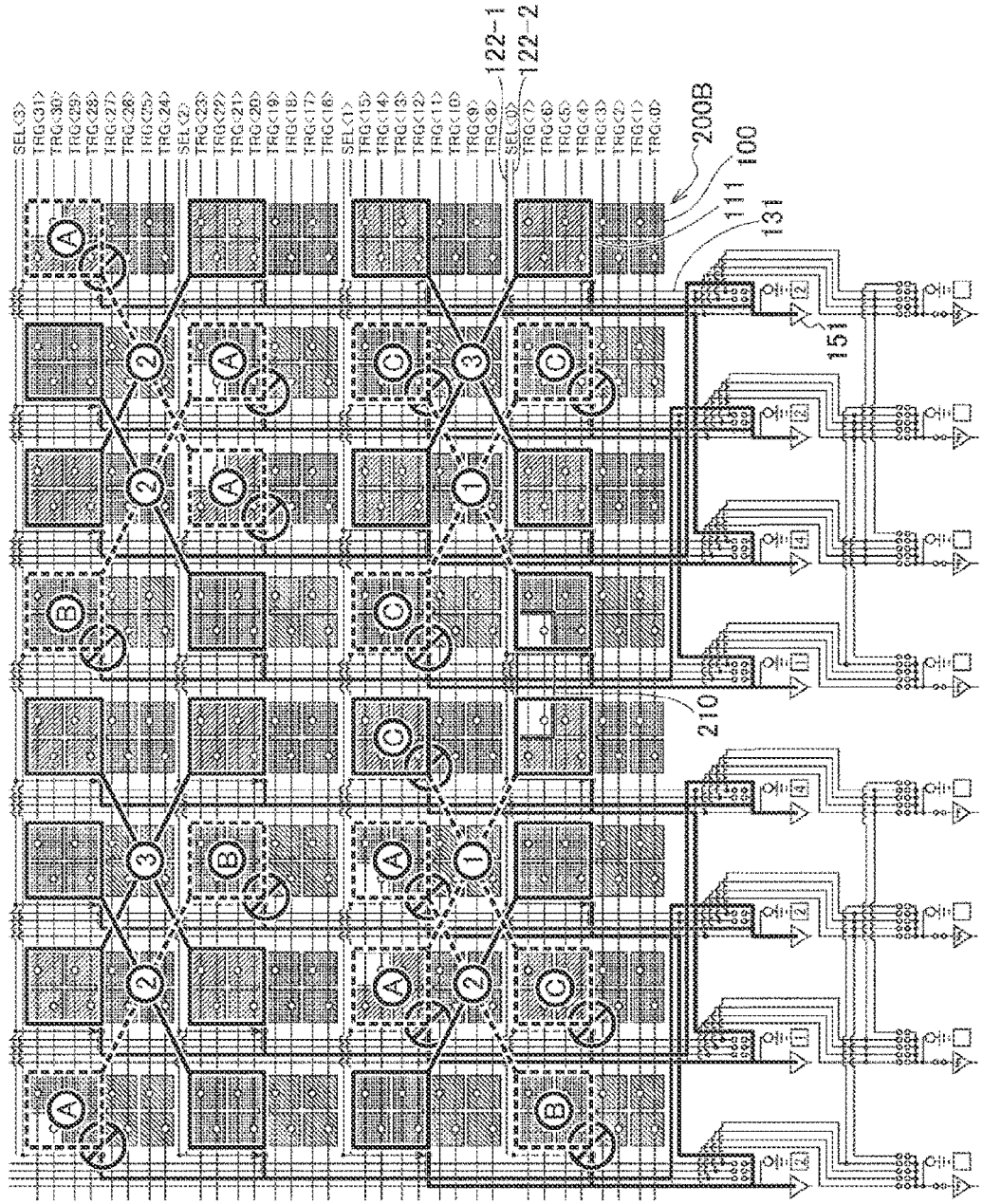
FIG. 10 is a view illustrating an example of drive control using two selection control lines in the neighboring-adjacent four-pixel addition/H2V2 addition method.

Specifically, as illustrated in FIG. 10, a case is assumed where phase difference pixels (2×1 OCL pixels) surrounded by a frame 210 are left, and other phase difference pixels (2×1 OCL pixels) are discarded.

In this case, "1" in the figure represents that control of the addition method of the first pattern is performed, and VSL transfer and addition are not performed on the three pixel units 200B (normal pixels of 12 pixels) in which the phase difference pixels in the frame 210 are left but the pixel unit 200B including the phase difference pixels is excluded. That is, "C" in the figure is a "non-addition pixel unit".

Furthermore, in FIG. 10, "2" in the figure represents that control of the addition method of the second pattern is performed, and a pixel unit 200B including the phase difference pixel is not read, and further, a pixel unit 200B located diagonally to the pixel unit 200B including the phase difference pixel is also not read. That is, "A" in the figure is the "pixel unit of phase difference pixel discarding", and "B" in the figure is the "companion pixel unit".

Moreover, in FIG. 10, "3" in the figure represents that control of the addition method of the third pattern is performed, and the normal H2V2 addition is performed on the four pixel units 200B (normal pixels of 16 pixels). Note that, in FIG. 10, a drive signal is applied to a transfer control line (TRG line), and the pixel 100 in the pixel unit 200B is selected.

As described above, by making the selection control line into multiple lines to control on/off of the VSL transfer, and realizing the control of the addition methods of the first pattern to the third pattern, it is possible to prevent addition of the phase difference pixel and the normal pixel while reducing the density of the phase difference pixel.

Figure 11:
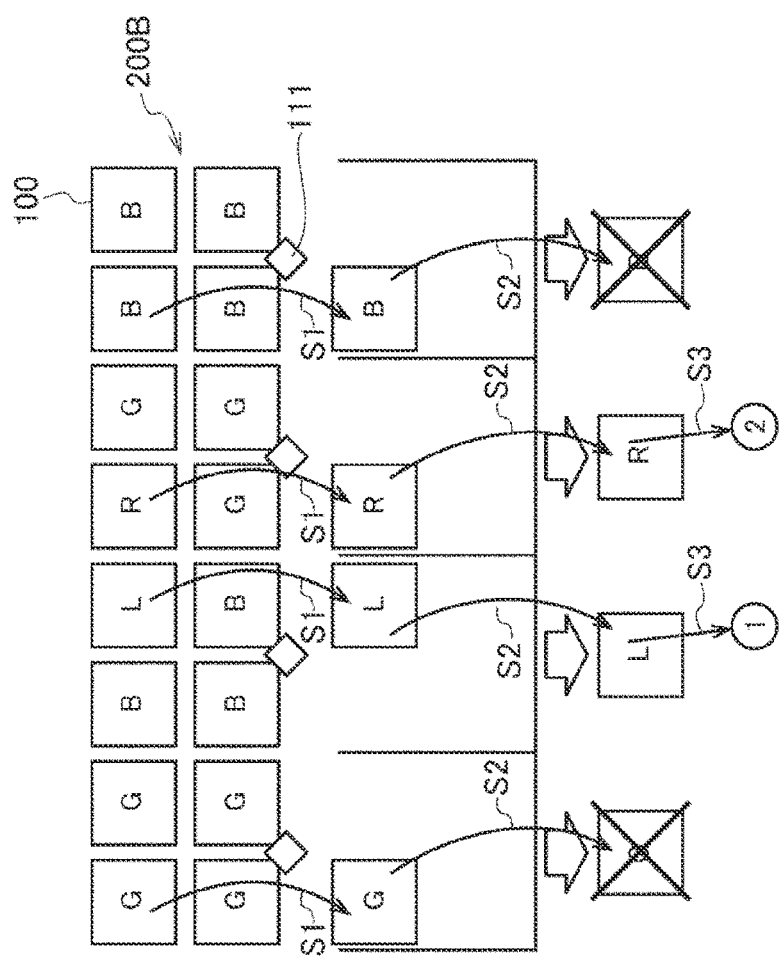
FIG. 11 is a view illustrating a driving operation of pixels in a case where the neighboring-adjacent four-pixel addition/H2V2 addition method is used.
Figure 12:
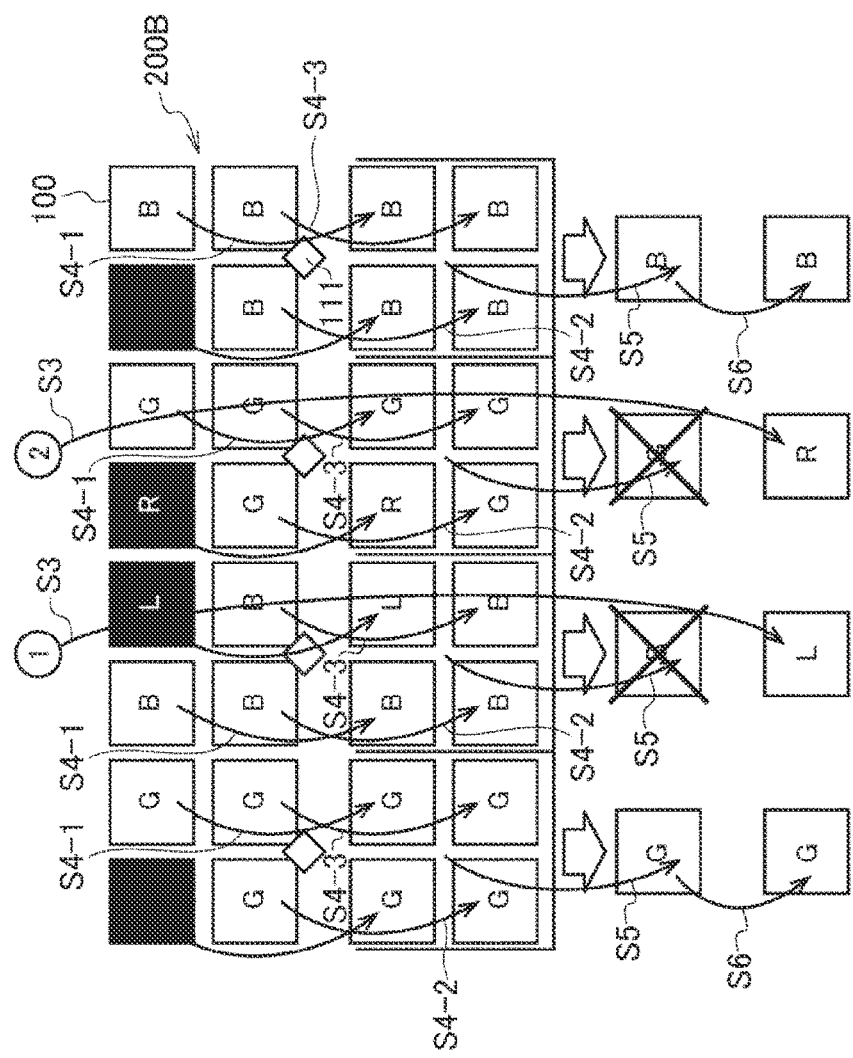
FIG. 12 is a view illustrating a driving operation of pixels in a case where the neighboring-adjacent four-pixel addition/H2V2 addition method is used.

Here, in the neighboring-adjacent four-pixel addition/H2V2 addition method, in performing the neighboring-adjacent four-pixel addition, driving illustrated in FIGS. 11 and 12 is performed in order to cope with reading of the phase difference pixel.

In FIGS. 11 and 12, among the four pixel units 200B arranged in the horizontal direction, two B and G pixel units 200B at the center respectively include phase difference pixels 100L and 100R, in addition to the normal pixels. Whereas, in the left and right G and B pixel units 200B, four pixels are normal pixels.

In performing the neighboring-adjacent four-pixel addition, as illustrated in FIG. 11, charges accumulated in a photoelectric conversion element of one pixel among four pixels constituting each pixel unit 200B are transferred to the floating diffusion region 111 different for every pixel unit 200B (S1 in FIG. 11).

At this time, pixel signals obtained from the phase difference pixels 100L and 100R of the B and G pixel units 200B at the center are held (S2 in FIG. 11).

Thereafter, as illustrated in FIG. 12, charges accumulated in photoelectric conversion elements of the four pixels constituting each pixel unit 200B are transferred to the floating diffusion region 111 (S4-1 to S4-3 in FIG. 12).

Note that, in FIG. 12, one pixel targeted for transfer in FIG. 11 is represented by a black square, and those pixels are also transferred again.

At this time, among the four pixel units 200B arranged in the horizontal direction, since the G and B pixel units 200B on the left and right include only normal pixels, four pixels are individually added (S5 in FIG. 12), and subsequent processing is performed on an added signal obtained as a result (S6 in FIG. 12).

Furthermore, since the B and G pixel units 200B at the center respectively include phase difference pixels 100L and 100R in addition to the normal pixels that are the B and G pixels, the subsequent processing is performed on pixel signals from the held phase difference pixels 100L and 100R (S3 in FIGS. 11 and 12) without using an added signal obtained by adding the four pixels (S5 in FIG. 12).

As described above, in performing the neighboring-adjacent four-pixel addition, it is also applicable to reading of the phase difference pixel, and thereafter, the H2V2 addition is performed.

3. Modified Example (Extension of Selection Control Line)

In the description described above, a description has been given to the configuration in which the selection control line is increased into two lines, as making selection control lines into multiple lines, to control on/off of the VSL transfer, but the number of selection control lines is not limited to two, and more selection control lines such as three can be provided.

Figure 13:
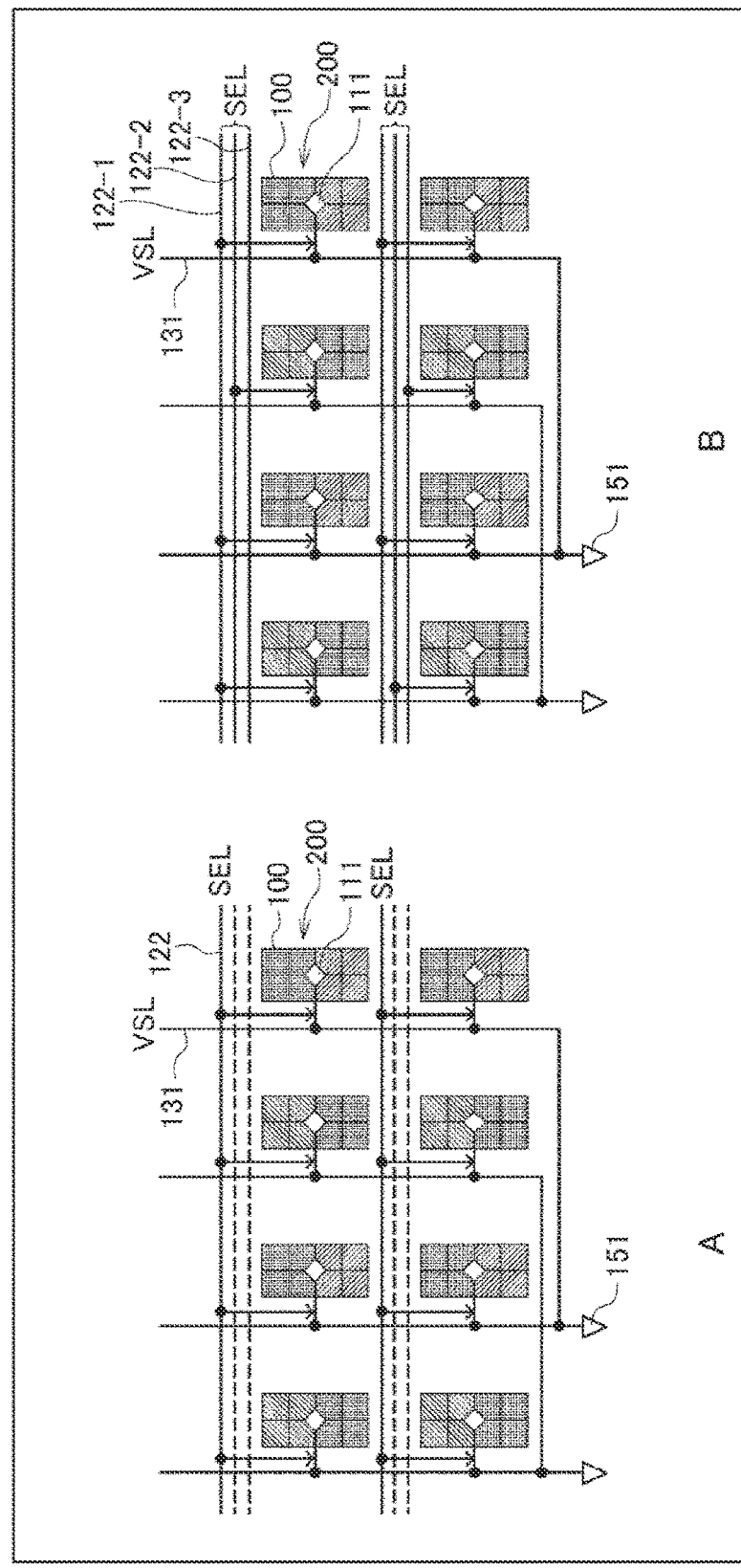
FIG. 13 is a view illustrating another example of the configuration in which the selection control line is made into multiple lines.

Specifically, as illustrated in FIG. 13, one selection control line (SEL) 122 (A of FIG. 13) can be made into three selection control lines (SEL) 122-1, 122-2, and 122-3 (B of FIG. 13) as multiple lines, and connection between the vertical signal line (VSL) 131 and the floating diffusion region (FD) 111 can be controlled.

Here, by making the selection control line 122 into three lines as multiple lines, as illustrated in FIG. 14, seven ways of reading according to Cases 0 to 6 can be realized.

That is, in FIG. 14, three selection control lines are individually associated with Cases 0 to 6, where "o" indicates that the target selection control line 122 is driven, and "x" indicates that the target selection control line 122 is not driven.

Figure 15:
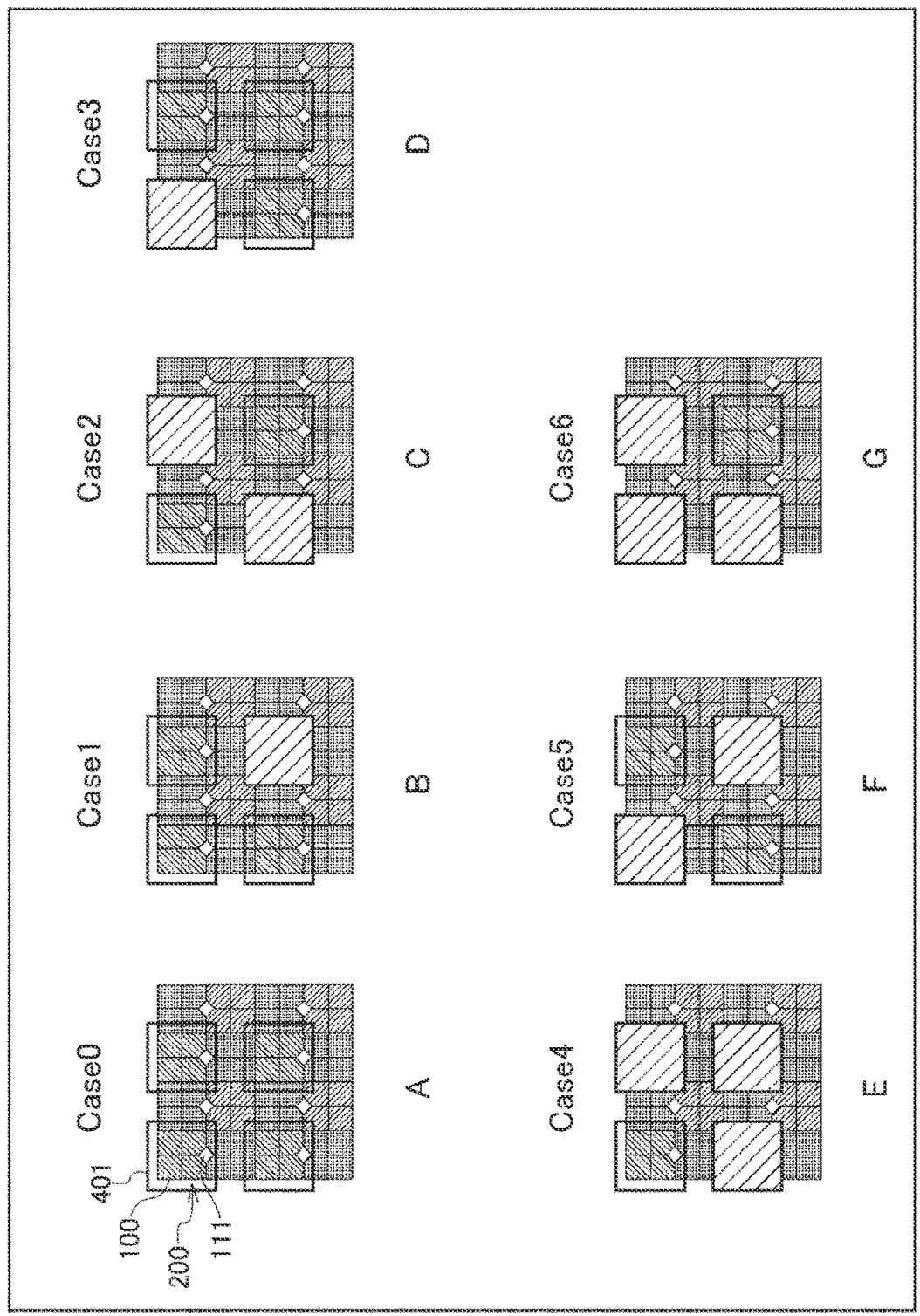
FIG. 15 is a view illustrating an example of read drive.

Specifically, in a case where all the three selection control lines of the selection control lines 122-1 to 122-3 are driven, the four pixel units 200 of the same color in a frame 401 in A of FIG. 15 can be read as Case 0, and pixel signals thereof can be added. Furthermore, also in Cases 1 to 6, similarly to Case 0, the pixel units 200 of the same color are read in accordance with driving of the three selection control lines 122-1 to 122-3, and are added (FD addition) in the floating diffusion region 111 (B to G in FIG. 15).

As described above, in the current technology, since connection from the floating diffusion region (FD) 111 to the vertical signal line (VSL) 131 is determined by a physical configuration, a source follower (SF) addition method has been able to be performed only by one way. In the technology according to the present disclosure, it is possible to control variations of the SF addition by making the selection control line into multiple lines and controlling the driving thereof.

Configuration Example of Light-Shielded Pixel

Furthermore, in the description described above, a case where 2×1 OCL pixels are used as the phase difference pixels has been described, but other phase difference pixels such as light-shielded pixels may be used.

Figure 16:
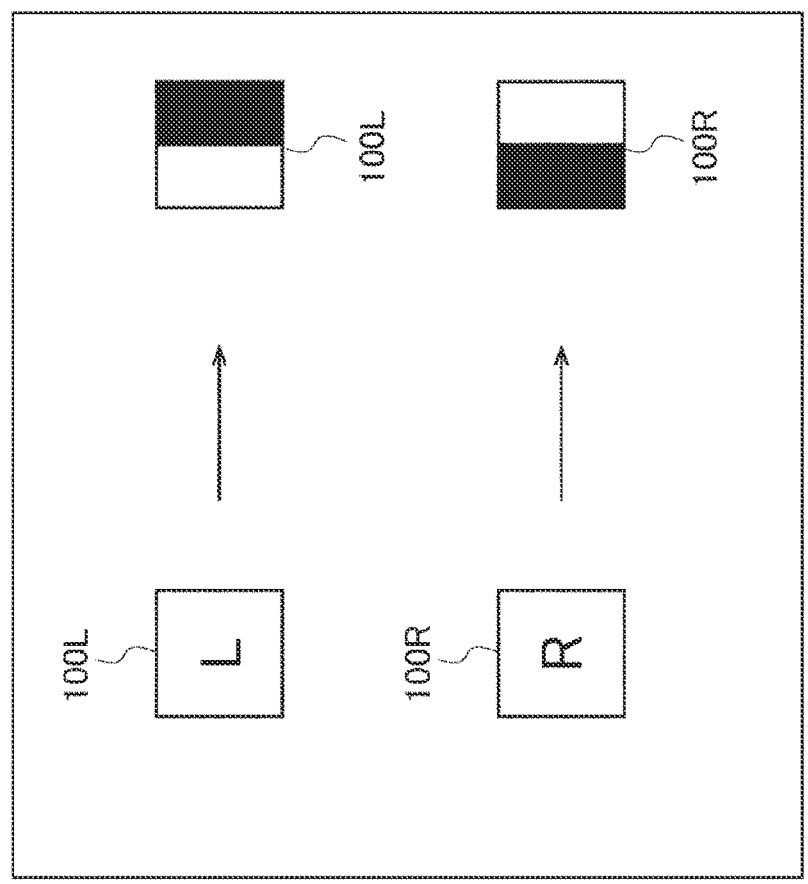
FIG. 16 is a view illustrating an example of a configuration of a light-shielded pixel.

Here, as illustrated in FIG. 16, a light-shielded pixel 100L and a light-shielded pixel 100R in which light-shielded regions are laterally symmetrical can be used. That is, the light-shielded pixel 100L and the light-shielded pixel 100R are paired as phase difference pixels, and a phase difference is detected on the basis of light-shielded pixel signals obtained from the light-shielded pixels 100L and 100R.

Example of Left-Right Interleave Structure

Meanwhile, in order to achieve a high frame rate, there is a horizontal interleave structure used as a method of performing simultaneous parallel reading on twice as many rows as vertical signal lines (VSL). Furthermore, in the above description, a method has been shown in which, in a case where the phase difference pixels 100L and 100R are arranged in accordance with a predetermined rule in the pixel array unit 11 in which the pixel units 200 having four pixels of the same color are regularly arranged, a density of the phase difference pixels 100L and 100R is adjusted in performing drive control by the H2V2 addition method.

Hereinafter, a configuration will be described in which these two methods are simultaneously satisfied and a pixel signal can be read in predetermined units of pixels such as 2×2 pixels.

Figure 17:
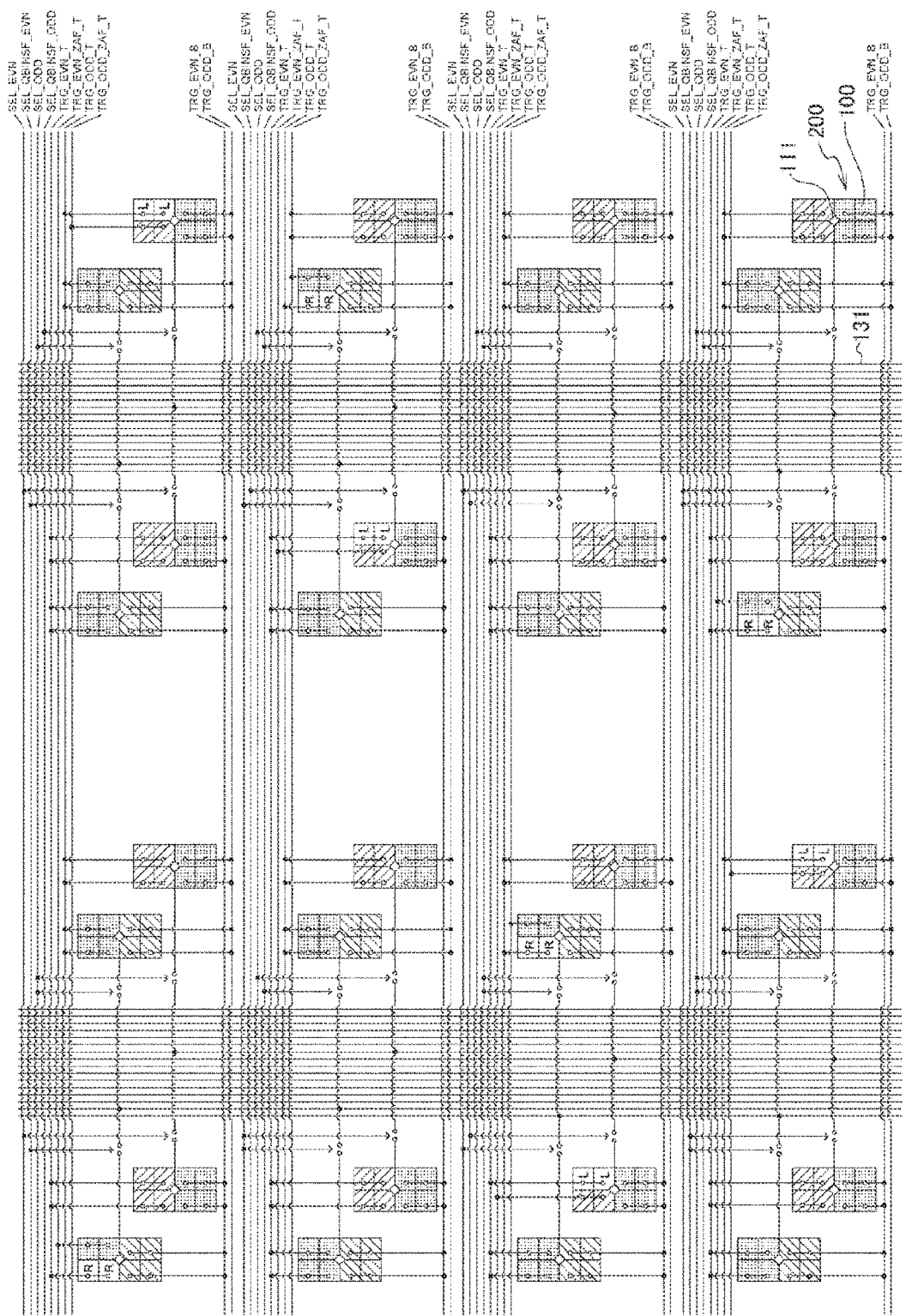
FIG. 17 is a view illustrating another example of read drive of the pixel unit arranged in the pixel array unit.

FIG. 17 illustrates another example of read drive of the pixel unit 200 arranged in a Bayer array in the pixel array unit 11. Furthermore, for easy understanding of description, FIG. 18 illustrates an enlarged view of a part of the region in which the pixel unit 200 illustrated in FIG. 17 is arranged.

In the pixel array unit 11, all the four pixels constituting the pixel unit 200 are the pixels 100 of the same color. Furthermore, in the pixel array unit 11, the phase difference pixels 100L and 100R are periodically arranged in predetermined units of pixels such as units of 16×16 pixels.

The pixel array unit 11 adopts a left-right interleave structure. The left-right interleave structure is a structure in which the left and right are divided and pixel signals are read, and is a structure in which the vertical signal line (VSL) 131 connected with specific two floating diffusion regions (FD) 111 is common. Since the vertical signal line (VSL) 131 is common, which column is to be read is selected by switch control according to a drive signal (SEL signal) applied to the selection control line (SEL line).

Figure 18:
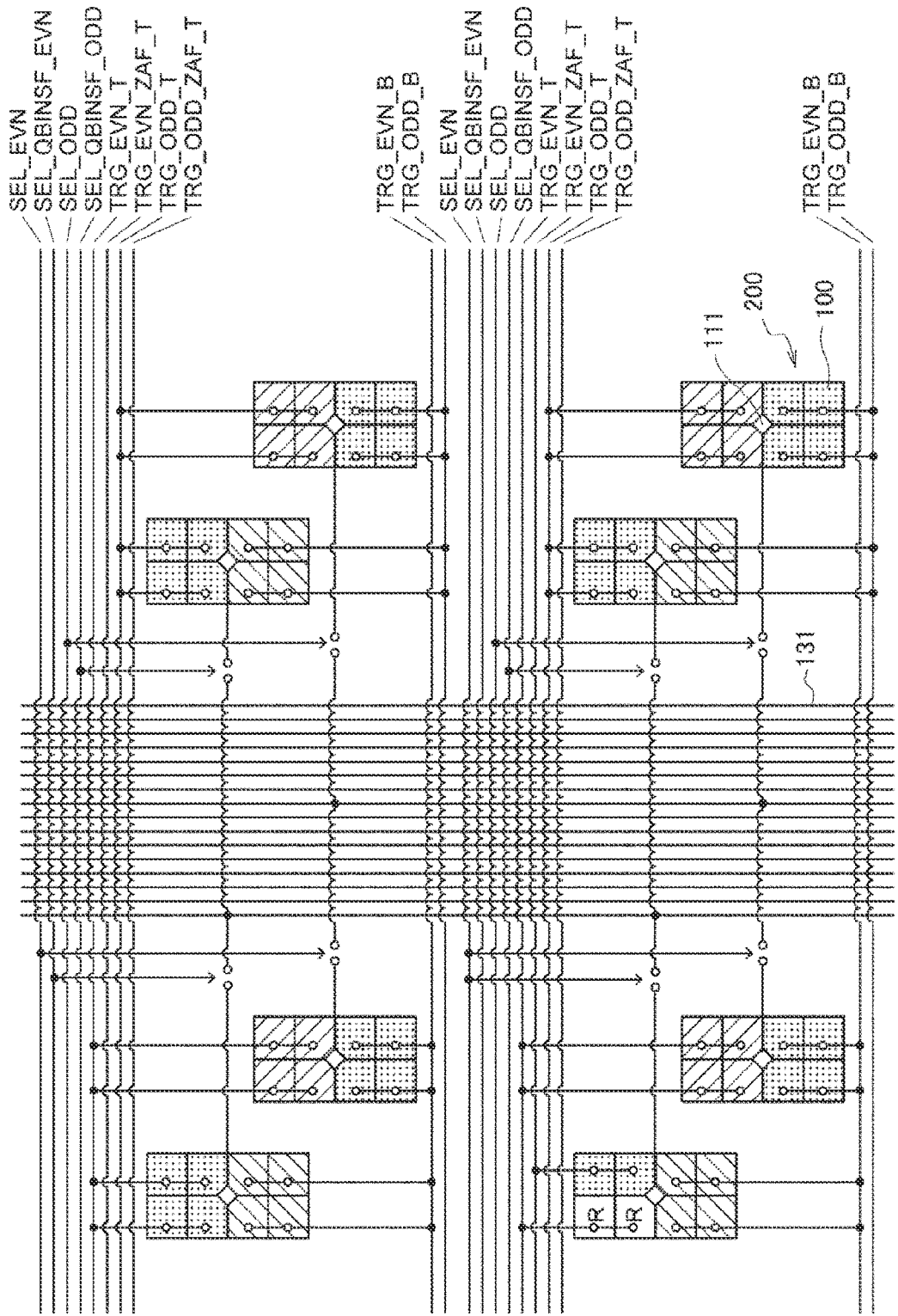
FIG. 18 is an enlarged view illustrating another example of read drive of the pixel unit arranged in the pixel array unit.

For example, in the enlarged view of FIG. 18, for a plurality of vertical signal lines (VSL) 131, there are the floating diffusion region (FD) 111 shared by the upper and lower pixel units 200 on the left side and the floating diffusion region (FD) 111 shared by the upper and lower pixel units 200 on the right side, and the vertical signal line (VSL) 131 connected with the two floating diffusion regions (FD) 111 in the different columns on the left side and the right side is common. However, in the floating diffusion regions (FD) 111 of the left column and the right column connected to the common vertical signal line (VSL) 131, the shared upper and lower pixel units 200 individually have the same color, and are individually arranged in the same row.

As described above, since the floating diffusion regions (FD) 111 of two columns (two columns of the left column and the right column) share the vertical signal line (VSL) 131 in the pixel array unit 11, an operation of separately reading the left and right floating diffusion regions (FDs) 111 is performed in a mode (pattern) in which the SF addition is not performed, in the drive control described above.

Here, a case is assumed where the drive control described above is performed in a type in which there are two vertical signal lines (VSL) 131 for a column of the floating diffusion region (FD) 111. In this case, while the number of rows that can be simultaneously read in a case of using a non-left-right interleave structure is four rows (FD rows), the number of rows that can be simultaneously read is eight rows (FD rows) in a case of using the left-right interleave structure, and twice the number of rows of the non-left-right interleave structure can be read. That is, the left-right interleave structure is a structure in which reading at a high frame rate is devised.

In the pixel array unit 11, among the pixel units 200 sharing the same floating diffusion region (FD) 111, the pixel unit 200 including four R, G, or B pixels 100 corresponding to upper R, G, or B color filters is referred to as a top-side pixel unit 200, while the pixel unit 200 including four pixels of R, G, or B pixels 100 corresponding to lower R, G, or B color filters is referred to as a bottom-side pixel unit 200.

In reading the top-side pixel unit 200, the floating diffusion region (FD) 111 that is a non-addition target is connected to a selection control line that is SELQBINSF, and other floating diffusion region (FD) 111 is connected to a selection control line that is SEL. In a case of using the left-right interleave structure, since it is necessary to independently control the left column and the right column individually in addition to this, selection control lines that are SEL and SELQBINSF are individually prepared for the left column and the right column.

In FIGS. 17 and 18, "*_EVN" is described in the selection control line for the left column, and "*_ODD" is described in the selection control line for the right column. That is, four types of selection control lines (SEL lines) of SEL_EVN, SELQBINSF_EVN, SEL_ODD, and SELQBINSF_ODD are prepared.

Moreover, also for a transfer control line (TRG line) that selects the pixel 100 in the pixel unit 200 sharing the floating diffusion region (FD) 111, the left column and the right column are prepared similarly to the selection control line (SEL line) since it is necessary to independently control the left column and the right column individually.

In FIGS. 17 and 18, "*_T" is described in a transfer control line for the top-side pixel unit, "*_B" is described in a transfer control line for the bottom-side pixel unit, and "*_ZAF" is described in a transfer control line for an adjacent pixel of the phase difference pixels 100L and 100R. That is, six types of transfer control lines (TRG lines) of TRG_EVN_T, TRG_EVN_B, TRG_EVN_ZAF, TRG_ODD_T, TRG_ODD_B, and TRG_ODD_ZAF are prepared.

These transfer control lines and selection control lines are summarized as follows.

(Transfer Control Line)

To TRG_EVN_T, a drive signal (TRG signal) for transfer control (TRG control) of the pixel 100 in the top-side pixel unit 200 in the left column is applied (outputted). To TRG_EVN_B, a drive signal for transfer control of the pixel 100 in the bottom-side pixel unit 200 in the left column is applied.

To TRG_ODD_T, a drive signal for transfer control of the pixel 100 in the top-side pixel unit 200 in the right column is applied. To TRG_ODD_B, a drive signal for transfer control of the pixel 100 in the bottom-side pixel unit 200 in the right column is applied.

To TRG_EVN_ZAF, a drive signal for transfer control of the pixel 100 adjacent to the phase difference pixels 100L and 100R in the left column is applied. To TRG_ODD_ZAF, a drive signal for transfer control of the pixel 100 adjacent to the phase difference pixels 100L and 100R on the right column is applied.

(Selection Control Line)

To SEL_EVN, a drive signal (SEL signal) established by logic according to signal levels of transfer control lines that are TRG_EVN_T, TRG_EVN_B, and TRG_EVN_ZAF is applied (outputted). That is, in SEL_EVN, output is performed according to an input signal that is RSEL in a case where "TRG_EVN_*" is in a state of Read, while the output is fixed to a Low level in a case where "TRG_EVN_*" is in a state other than Read.

To SEL_ODD, a drive signal that is established by logic according to signal levels of transfer control lines that are TRG_ODD_T, TRG_ODD_B, and TRG_ODD_ZAF is applied. That is, in SEL_ODD, output is performed according to an input signal that is RSEL in a case where "TRG_ODD_*" is in a state of Read, while the output is fixed to a Low level in a case where "TRG_ODD_*" is in a state other than Read.

To SELQBINSF_EVN, a drive signal established by logic according to signal levels of transfer control lines that are TRG_EVN_T, TRG_EVN_B, and TRG_EVN_ZAF is applied. That is, in SELQBINSF_EVN, output is performed according to an input signal that is RSELQBINSF in a case where "TRG_EVN_*" is in a state of Read, while the output is fixed to a Low level in a case where "TRG_EVN_*" is in a state other than Read. Note that the input signal that is RSELQBINSF is required to be fixed at the Low level when the floating diffusion region (FD) 111 that is the non-addition target is read in the drive control described above, for example.

To SELQBINSF_ODD, a drive signal that is established by logic according to signal levels of transfer control lines that are TRG_ODD_T, TRG_ODD_B, and TRG_ODD_ZAF is applied. That is, in SELQBINSF_ODD, output is performed according to an input signal that is RSELQBINSF in a case where "TRG_ODD_*" is in a state of Read, while the output is fixed to a Low level in a case where "TRG_ODD_*" is in a state other than Read. Note that the input signal that is RSELQBINSF is required to be fixed at the Low level when the floating diffusion region (FD) 111 that is the non-addition target is read in the drive control described above, for example.

In this manner, in performing the drive control described above, by controlling the drive signals (TRG signals and SEL signals) applied to the transfer control line (TRG_EVN_B, TRG_EVN_T, TRG_EVN_ZAF, TRG_ODD_B, TRG_ODD_T, and TRG_ODD_ZAF) and the selection control line (SEL_EVN, SELQBINSF_EVN, SEL_ODD, and SELQBINSF_ODD), the phase difference pixels 100L and 100R are thinned out and read at a certain period in order to prevent the density of the phase difference pixels 100L and 100R that cause defects in a captured image from becoming too high.

At this time, since barycenters of the pixels after the H2V2 addition are aligned by controlling the drive signal applied to the selection control line and thinning out the pixels 100 located diagonally to the thinned phase difference pixels 100L and 100R as well in a similar manner, a defect density can be suppressed while a color center of gravity is kept at the center. This thinning method is as described in the drive control described above.

As described above, in the configuration illustrated in FIGS. 17 and 18, the drive control described above can be realized at a high frame rate and with fewer vertical signal lines (VSL), and further, a point defect density derived from the phase difference pixel in the captured image can be controlled. Moreover, the pixel signal can be read in predetermined units of pixels such as 2×2 pixels.

Example of Other Methods

Furthermore, in the above description, the three-exposure HDR/H2V2 addition method and the neighboring-adjacent four-pixel addition/H2V2 addition method have been described as an example, but another method using the H2V2 addition may be used. Moreover, the H2V2 addition is an example of horizontal/vertical addition, and any method may be used as long as horizontal/vertical addition is performed on a pixel signal of a predetermined pixel in the horizontal direction and a pixel signal of a predetermined pixel in the vertical direction, without limiting to the addition in two pixels in the horizontal direction and two pixels in the vertical direction.

(Achieving Both High-Speed Frame Rate Driving and PDAF)

Here, in order to achieve a high frame rate, it is necessary to reduce a total number of pixels by pixel addition and to increase the number of simultaneous AD conversions in the horizontal direction. Whereas, in order to achieve both driving at a high frame rate (multi-pixel addition) and phase detection AF (PDAF), it is necessary to perform driving to leave phase difference pixels (2×1 OCL pixels) at the time of pixel addition. Therefore, as a current achievement method, by using one selection control line for every one FD at a time of SF addition, only phase difference pixels (2×1 OCL pixels) have been selected by Mux control before AD conversion.

In this achievement method, there is a restriction on increasing simultaneous AD conversion in the horizontal direction, and thus it is necessary to solve this problem. However, in the technology according to the present disclosure, this problem can be solved by making the selection control line into multiple lines.

As described above, according to the technology according to the present disclosure, in a case of using a configuration in which the phase difference pixels 100L and 100R are included in (the pixel unit 200 including) the plurality of pixels 100 arrayed two-dimensionally in the pixel array unit 11, when horizontal/vertical addition is performed on a pixel signal of the predetermined pixel 100 in the horizontal direction and a pixel signal of the predetermined pixel 100 in the vertical direction in reading the plurality of pixels 100, deterioration of phase difference information can be suppressed by partially non-adding the phase difference pixels 100L and 100R.

In particular, in recent years, an image sensor for mobile devices has been increased in number of pixels, and an image reduction technique for coping with a moving image format at high speed and low power is required. In performing the neighboring-adjacent four-pixel addition and the H2V2 addition which are image reduction techniques, currently, the phase difference pixel is also added to the normal pixel, so that phase difference information has been lost and image quality has been adversely affected. Furthermore, currently, pixel thinning (H2V2 thinning) is performed in a case where further reduction is performed after using the three-exposure HDR, and there is a problem in image quality such as occurrence of deterioration and aliasing of a signal-noise ratio (SN ratio).

Whereas, in the technology according to the present disclosure, in performing the H2V2 addition by using the three-exposure HDR/H2V2 addition method or the neighboring-adjacent four-pixel addition/H2V2 addition method, the density of the phase difference pixels is prevented from excessively increasing even at the time of image reduction, by mixing a region in which only the phase difference pixels are added or selected and a region in which the normal pixels are added or selected. This configuration makes it possible to achieve a high-speed and low-power operation while suppressing image quality deterioration as much as possible, without losing phase difference information even at the time of image reduction.

Furthermore, in the technology according to the present disclosure, in using the three-exposure HDR/H2V2 addition method, the same exposure signal is analog added while the same shutter control as that of the current three-exposure HDR is maintained. This configuration makes it possible to improve a reading speed and further suppress power consumption while improving the SN ratio.

However, when the H2V2 addition described above is uniformly performed on all the pixels, in a case where phase difference pixels are embedded, phase difference information is deteriorated by adding the phase difference pixel and the normal pixel, and a density of pixels affected by the phase difference pixels increases, which causes a concern about an adverse effect on the image quality by performing correction. In order to avoid this adverse effect, deterioration of the phase difference information and deterioration of the image quality are suppressed by performing drive control of the selection control line made into multiple lines described above.

Note that Patent Document 1 described above discloses an addition method for achieving phase difference detection and HDR at a time of detecting the overall phase difference, but a method for selectively adding embedded phase difference pixels is surely not disclosed nor suggested.

Furthermore, Patent Document 2 described above discloses that phase difference pixels are arranged in accordance with an addition method, but there is no disclosure or suggestion about a configuration in which an addition pixel is selected by wiring of a selection control line and drive control as in the technology according to the present disclosure.

4. Configuration of Electronic Device

Figure 19:
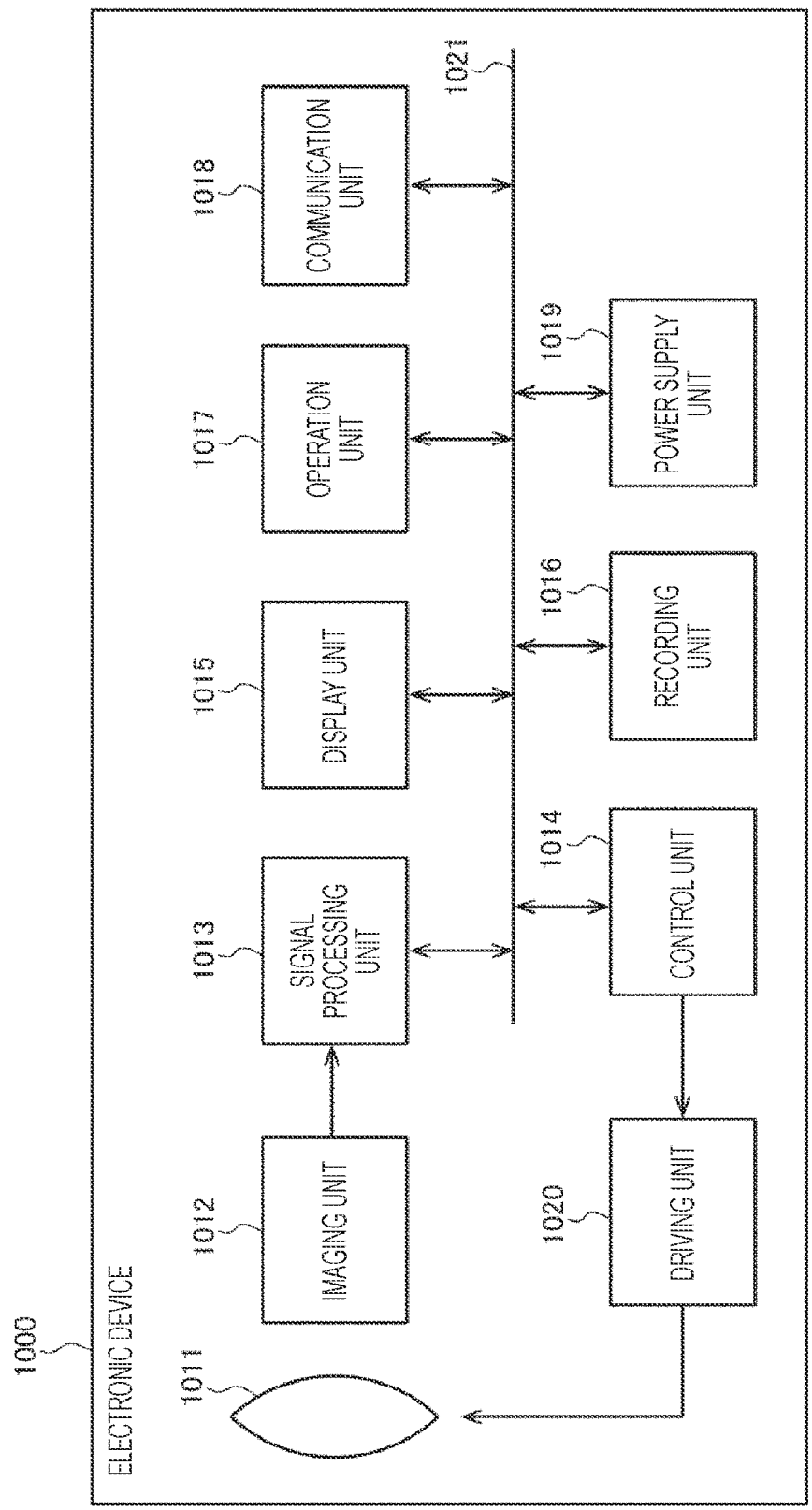
FIG. 19 is a block diagram illustrating an example of a configuration of an electronic device equipped with a solid-state imaging device to which the technology according to the present disclosure is applied.

FIG. 19 is a block diagram illustrating a configuration example of an electronic device having a solid-state imaging device to which the technology according to the present disclosure is applied.

An electronic device 1000 is, for example, an electronic device having an imaging function, such as an imaging device such as a digital still camera or a video camera, or a portable terminal device such as a smartphone or a tablet terminal.

The electronic device 1000 includes a lens unit 1011, an imaging unit 1012, a signal processing unit 1013, a control unit 1014, a display unit 1015, a recording unit 1016, an operation unit 1017, a communication unit 1018, a power supply unit 1019, and a driving unit 1020.

Furthermore, in the electronic device 1000, the signal processing unit 1013, the control unit 1014, the display unit 1015, the recording unit 1016, the operation unit 1017, the communication unit 1018, and the power supply unit 1019 are connected to one another via a bus 1021.

The lens unit 1011 includes a zoom lens, a focus lens, and the like, and collects light from a subject. The light (subject light) collected by the lens unit 1011 is incident on the imaging unit 1012.

The imaging unit 1012 includes a solid-state imaging device (for example, the solid-state imaging device 10 in FIG. 1) to which the technology according to the present disclosure is applied. In the imaging unit 1012, light (subject light) received via the lens unit 1011 by the solid-state imaging device is photoelectrically converted into an electric signal, and a signal obtained as a result is supplied to the signal processing unit 1013.

Note that, a pixel array unit of the solid-state imaging device includes, as a plurality of pixels regularly arrayed in a predetermined arrangement pattern, a pixel (normal pixel) to generate a signal for generating a captured image according to subject light and a pixel (phase difference pixel) to generate a signal for performing phase difference detection.

For example, in the above-described solid-state imaging device 10 (FIG. 1), the normal pixel corresponds to the R pixel 100 (R pixel unit 200), the G pixel 100 (G pixel unit 200), and the B pixel 100 (B pixel unit 200), and the phase difference pixel corresponds to the phase difference pixels 100L and 100R and the light-shielded pixels 100L and 100R.

The signal processing unit 1013 is a signal processing circuit that processes a signal supplied from the imaging unit 1012. For example, the signal processing unit 1013 is configured as a digital signal processor (DSP) circuit or the like.

The signal processing unit 1013 processes a signal from the imaging unit 1012, generates image data of a still image or a moving image, and supplies to the display unit 1015 or the recording unit 1016. Furthermore, on the basis of a signal from the imaging unit 1012 (a phase difference pixel of the image sensor), the signal processing unit 1013 generates data (phase difference detection data) for detecting a phase difference, and supplies to the control unit 1014.

The control unit 1014 is configured as, for example, a central processing unit (CPU), a microprocessor, or the like. The control unit 1014 controls an operation of each unit of the electronic device 1000.

The display unit 1015 is configured as, for example, a display device such as a liquid crystal panel or an organic electro-luminescence (EL) panel. The display unit 1015 processes image data supplied from the signal processing unit 1013, and displays a still image or a moving image captured by the imaging unit 1012.

The recording unit 1016 is configured as, for example, a recording medium such as a semiconductor memory or a hard disk. The recording unit 1016 records image data supplied from the signal processing unit 1013. Furthermore, the recording unit 1016 provides recorded image data under the control of the control unit 1014.

The operation unit 1017 is configured as, for example, a touch panel in combination with the display unit 1015, in addition to physical buttons. The operation unit 1017 outputs operation commands for various functions of the electronic device 1000, in accordance with an operation by a user. The control unit 1014 controls an operation of each unit on the basis of an operation command supplied from the operation unit 1017.

The communication unit 1018 is configured as, for example, a communication interface circuit or the like. The communication unit 1018 exchanges data between with an external device by wireless communication or wired communication in accordance with a predetermined communication standard.

The power supply unit 1019 appropriately supplies various power sources to be operation power sources of the signal processing unit 1013, the control unit 1014, the display unit 1015, the recording unit 1016, the operation unit 1017, and the communication unit 1018, to these supply targets.

Furthermore, the control unit 1014 detects a phase difference between two images on the basis of phase difference detection data supplied from the signal processing unit 1013. Then, on the basis of a detection result of the phase difference, the control unit 1014 determines whether or not a target object to be focused (focusing object) is in focus. In a case where the focusing object is not in focus, the control unit 1014 calculates a focus shift amount (defocus amount) and supplies to the driving unit 1020.

The driving unit 1020 is configured with a motor, for example, and drives the lens unit 1011 including a zoom lens, a focus lens, or the like.

The driving unit 1020 calculates a drive amount of the focus lens of the lens unit 1011 on the basis of the defocus amount supplied from the control unit 1014, and moves the focus lens in accordance with the drive amount. Note that, in a case where the focusing object is in focus, the driving unit 1020 maintains the current position of the focus lens.

The electronic device 1000 is configured as described above.

5. Usage Example of Solid-State Imaging Device

Figure 20:
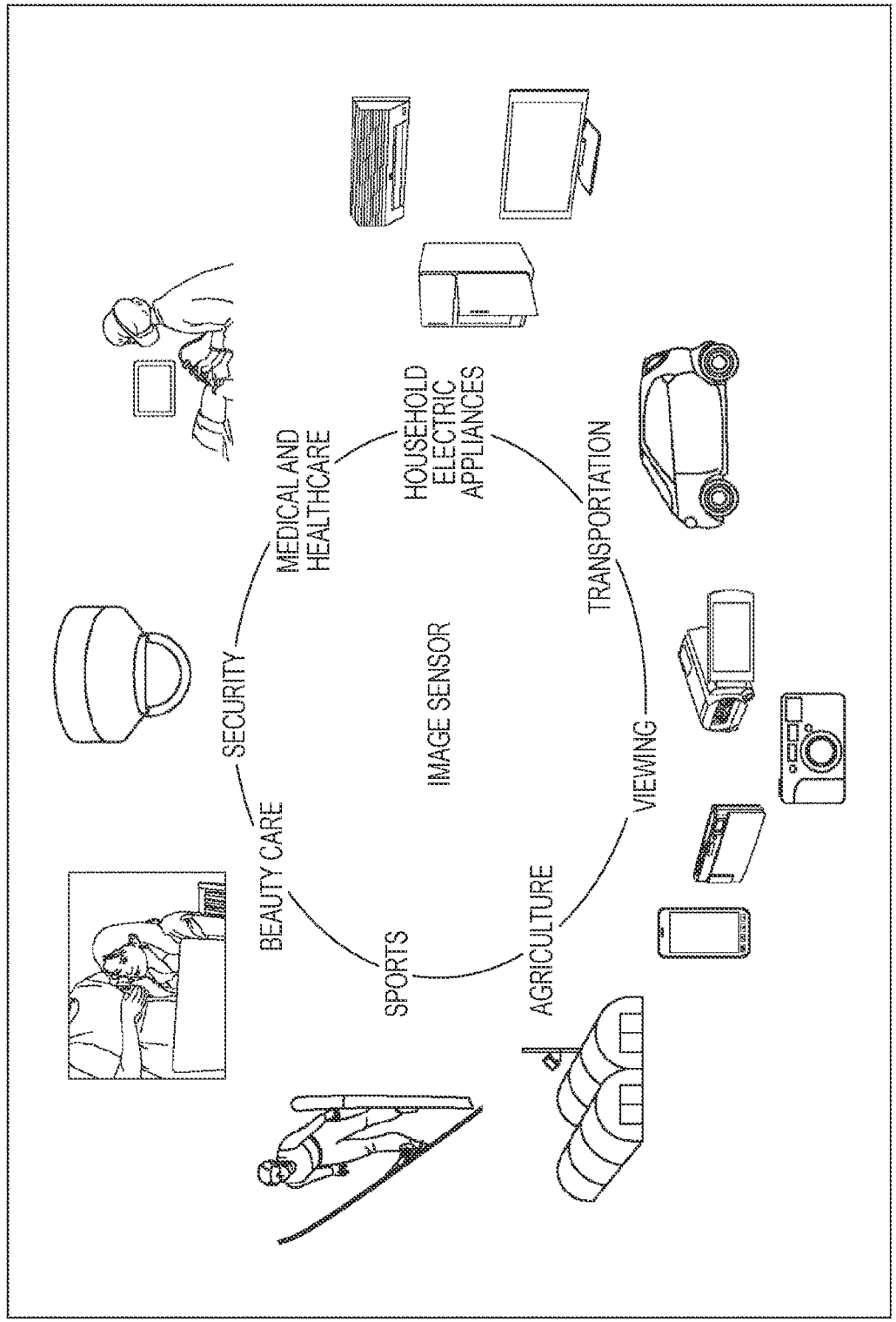
FIG. 20 is a view illustrating a usage example of a solid-state imaging device to which the technology according to the present disclosure is applied.

FIG. 20 is a view illustrating a usage example of a solid-state imaging device to which the technology according to the present disclosure is applied.

The solid-state imaging device 10 can be used in various cases for sensing light such as visible light, infrared light, ultraviolet light, and X-ray, as described below, for example. That is, as illustrated in FIG. 20, not only the field of viewing in which images for viewing are captured, the solid-state imaging device 10 can also be used, for example, in devices used in the field of transportation, the field of household electric appliances, the field of medical and healthcare, the field of security, the field of beauty care, the field of sports, the field of agriculture, or the like.

Specifically, in the field of viewing, the solid-state imaging device 10 can be used for devices (for example, the electronic device 1000 of FIG. 19) to capture an image to be used for viewing, for example, such as a digital camera, a smartphone, or a mobile phone with a camera function.

In the field of transportation, for example, for safe driving such as automatic stop, recognition of a state of a driver, and the like, the solid-state imaging device 10 can be used for devices used for transportation, such as vehicle-mounted sensors that capture an image in front, rear, surroundings, interior, and the like of an automobile, monitoring cameras that monitor traveling vehicles and roads, and distance measurement sensors that measure a distance between vehicles.

In the field of household electric appliances, for example, in order to capture an image of a user's gesture and operate a device in accordance with the gesture, the solid-state imaging device 10 can be used for devices used in household electric appliances such as TV receivers, refrigerators, and air conditioners. Furthermore, in the field of medical and healthcare, for example, the solid-state imaging device 10 can be used for devices used for medical and healthcare, such as endoscopes and devices that perform angiography by receiving infrared light.

In the field of security, for example, the solid-state imaging device 10 can be used for devices used for security, such as monitoring cameras for crime prevention or cameras for person authentication. Furthermore, in the field of beauty care, for example, the solid-state imaging device 10 can be used for devices used for beauty care, such as skin measuring instruments for image capturing of skin or microscopes for image capturing of scalp.

In the field of sports, for example, the solid-state imaging device 10 can be used for devices used for sports such as action cameras and wearable cameras for sports applications and the like. Furthermore, in the field of agriculture, for example, the solid-state imaging device 10 can be used for devices used for agriculture such as cameras for monitoring a condition of fields and crops.

6. Application Example to Mobile Object

The technology (the present technology) according to the present disclosure can be applied to various products. For example, the technology according to the present disclosure may be realized as a device equipped on any type of mobile objects, such as an automobile, an electric car, a hybrid electric car, a motorcycle, a bicycle, personal mobility, an airplane, a drone, a ship, a robot, and the like.

Figure 21:
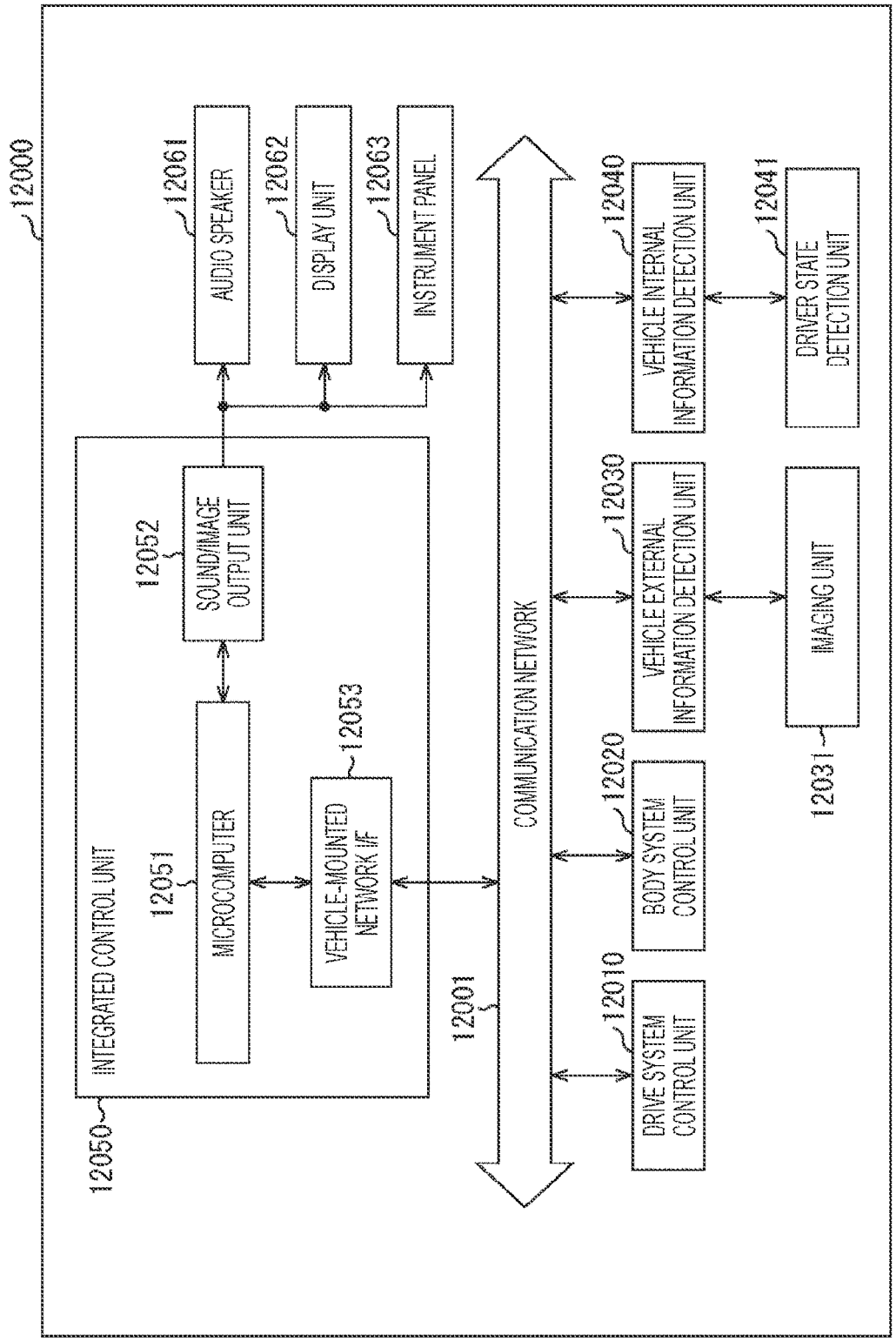
FIG. 21 is a block diagram illustrating an example of a schematic configuration of a vehicle control system.

FIG. 21 is a block diagram illustrating a schematic configuration example of a vehicle control system, which is an example of a mobile object control system to which the technology according to the present disclosure may be applied.

A vehicle control system 12000 includes a plurality of electronic control units connected via a communication network 12001. In the example illustrated in FIG. 21, the vehicle control system 12000 includes a drive system control unit 12010, a body system control unit 12020, a vehicle external information detection unit 12030, a vehicle internal information detection unit 12040, and an integrated control unit 12050. Furthermore, as a functional configuration of the integrated control unit 12050, a microcomputer 12051, a sound/image output unit 12052, and a vehicle-mounted network interface (I/F) 12053 are illustrated.

The drive system control unit 12010 controls an operation of devices related to a drive system of a vehicle in accordance with various programs. For example, the drive system control unit 12010 functions as: a driving force generation device for generation of a driving force of the vehicle such as an internal combustion engine or a drive motor; a driving force transmission mechanism for transmission of a driving force to wheels; a steering mechanism to adjust a steering angle of the vehicle; and a control device such as a braking device that generates a braking force of the vehicle.

The body system control unit 12020 controls an operation of various devices mounted on a vehicle body in accordance with various programs. For example, the body system control unit 12020 functions as a control device for a keyless entry system, a smart key system, a power window device, or various lamps such as a headlamp, a back lamp, a brake lamp, a turn indicator, or a fog lamp. In this case, the body system control unit 12020 may be inputted with radio waves or signals of various switches transmitted from a portable device that substitutes for a key. The body system control unit 12020 receives an input of these radio waves or signals, and controls a door lock device, a power window device, a lamp, and the like of the vehicle.

The vehicle external information detection unit 12030 detects information about an outside of the vehicle equipped with the vehicle control system 12000. For example, to the vehicle external information detection unit 12030, an imaging unit 12031 is connected. The vehicle external information detection unit 12030 causes the imaging unit 12031 to capture an image of an outside of the vehicle, and receives the captured image. The vehicle external information detection unit 12030 may perform an object detection process or a distance detection process for a person, a vehicle, an obstacle, a sign, a character on a road surface, or the like on the basis of the received image.

The imaging unit 12031 is an optical sensor that receives light and outputs an electric signal according to an amount of received light. The imaging unit 12031 can output the electric signal as an image, or can output as distance measurement information. Furthermore, the light received by the imaging unit 12031 may be visible light or non-visible light such as infrared light.

The vehicle internal information detection unit 12040 detects information inside the vehicle. The vehicle internal information detection unit 12040 is connected with, for example, a driver state detection unit 12041 that detects a state of a driver. The driver state detection unit 12041 may include, for example, a camera that images the driver, and, on the basis of detection information inputted from the driver state detection unit 12041, the vehicle internal information detection unit 12040 may calculate a degree of tiredness or a degree of concentration of the driver, or may determine whether or not the driver is asleep.

On the basis of information inside and outside the vehicle acquired by the vehicle external information detection unit 12030 or the vehicle internal information detection unit 12040, the microcomputer 12051 can operate a control target value of the driving force generation device, the steering mechanism, or the braking device, and output a control command to the drive system control unit 12010. For example, the microcomputer 12051 can perform cooperative control for the purpose of realizing functions of advanced driver assistance system (ADAS) including avoidance of collisions or mitigation of impacts of the vehicle, follow-up traveling on the basis of an inter-vehicle distance, vehicle speed maintenance traveling, vehicle collision warning, vehicle lane departure warning, and the like.

Furthermore, by controlling the driving force generation device, the steering mechanism, the braking device, or the like on the basis of the information about surroundings of the vehicle acquired by the vehicle external information detection unit 12030 or vehicle internal information detection unit 12040, the microcomputer 12051 may perform cooperative control for the purpose of, for example, automatic driving for autonomously traveling without depending on an operation of the driver.

Furthermore, the microcomputer 12051 can output a control command to the body system control unit 12020 on the basis of information about the outside of the vehicle acquired by the vehicle external information detection unit 12030. For example, the microcomputer 12051 can control a headlamp in accordance with a position of a preceding vehicle or an oncoming vehicle detected by the vehicle external information detection unit 12030, and perform cooperative control for the purpose of antiglare, such as switching a high beam to a low beam.

The sound/image output unit 12052 transmits an output signal of at least one of sound or an image, to an output device capable of visually or audibly notifying, of information, a passenger of the vehicle or outside the vehicle. In the example of FIG. 21, an audio speaker 12061, a display unit 12062, and an instrument panel 12063 are exemplified as the output devices. The display unit 12062 may include, for example, at least one of an on-board display or a head-up display.

Figure 22:
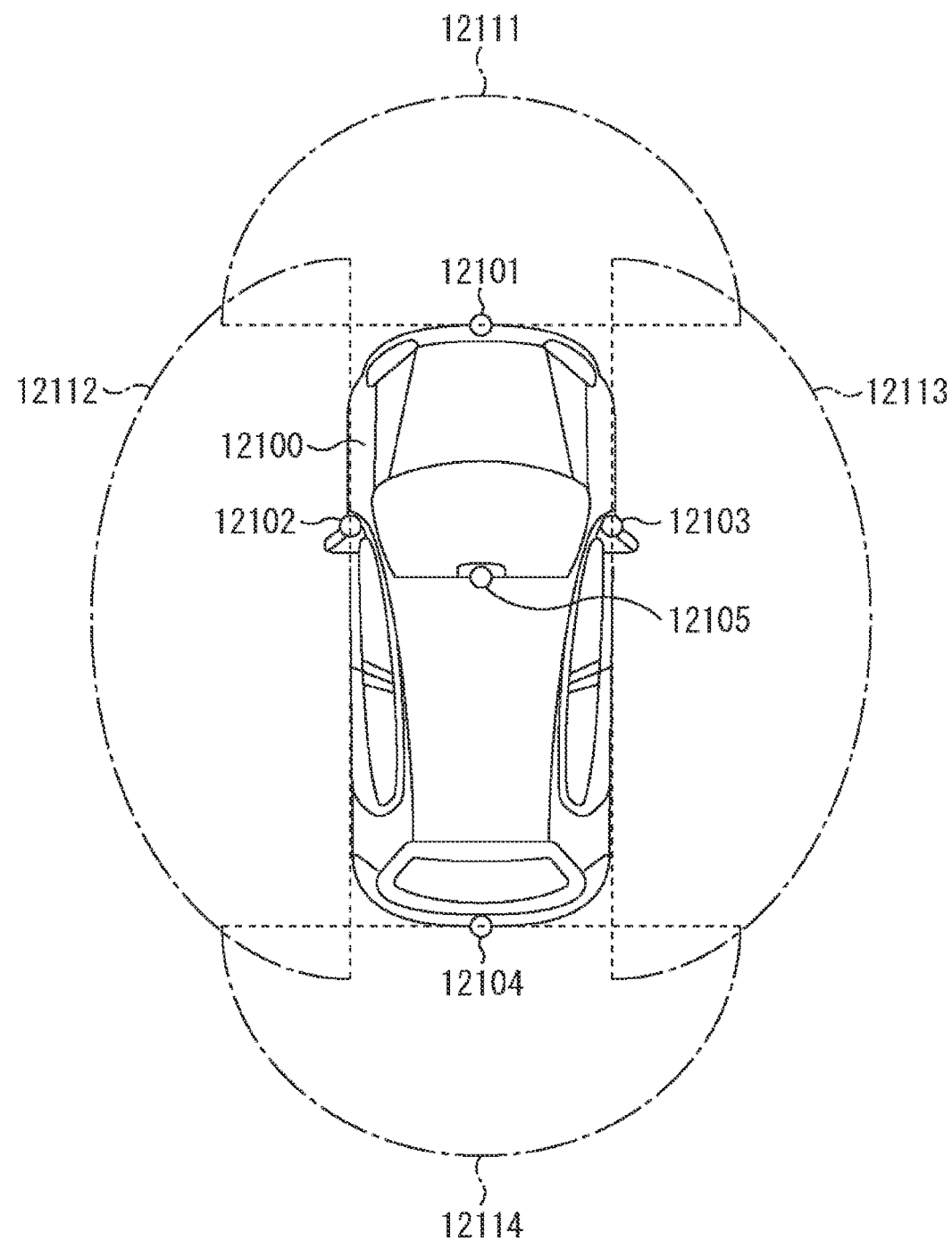
FIG. 22 is an explanatory view illustrating an example of an installation position of a vehicle external information detection unit and an imaging unit.

FIG. 22 is a view illustrating an example of an installation position of the imaging unit 12031.

In FIG. 22, as the imaging unit 12031, imaging units 12101, 12102, 12103, 12104, and 12105 are provided.

The imaging units 12101, 12102, 12103, 12104, and 12105 are provided at, for example, a front nose, side mirrors, a rear bumper, a back door, an upper part of a windshield in a vehicle cabin, or the like of a vehicle 12100. The imaging unit 12101 provided at the front nose and the imaging unit 12105 provided at the upper part of the windshield in the vehicle cabin mainly acquire an image in front of the vehicle 12100. The imaging units 12102 and 12103 provided at the side mirrors mainly acquire an image of a side of the vehicle 12100. The imaging unit 12104 provided at the rear bumper or the back door mainly acquires an image behind the vehicle 12100. The imaging unit 12105 provided at the upper part of the windshield in the vehicle cabin is mainly used for detection of a preceding vehicle, or a pedestrian, an obstacle, a traffic light, a traffic sign, a lane, or the like.

Note that FIG. 22 shows an example of an image capturing range of the imaging units 12101 to 12104. An imaging range 12111 indicates an imaging range of the imaging unit 12101 provided at the front nose, imaging ranges 12112 and 12113 indicate imaging ranges of the imaging units 12102 and 12103 each provided at the side mirrors, and an imaging range 12114 indicates an imaging range of the imaging unit 12104 provided at the rear bumper or the back door. For example, by superimposing image data captured by the imaging units 12101 to 12104, an overhead view image of the vehicle 12100 viewed from above can be obtained.

At least one of the imaging units 12101 to 12104 may have a function of acquiring distance information. For example, at least one of the imaging units 12101 to 12104 may be a stereo camera including a plurality of imaging elements, or an imaging element having pixels for detecting a phase difference.

For example, on the basis of the distance information obtained from the imaging units 12101 to 12104, by obtaining a distance to each solid object within the imaging ranges 12111 to 12114 and a time change of this distance (a relative speed with respect to the vehicle 12100), the microcomputer 12051 can extract, as a preceding vehicle, especially a solid object that is the closest on a travel route of the vehicle 12100, and that is traveling at a predetermined speed (for example, 0 km/h or more) in substantially the same direction as the vehicle 12100. Moreover, the microcomputer 12051 can set an inter-vehicle distance to be secured from a preceding vehicle in advance, and perform automatic brake control (including follow-up stop control), automatic acceleration control (including follow-up start control), and the like. In this way, it is possible to perform cooperative control for the purpose of, for example, automatic driving for autonomously traveling without depending on an operation of the driver.

For example, on the basis of the distance information obtained from the imaging units 12101 to 12104, the microcomputer 12051 can classify solid object data regarding solid objects into a two-wheeled vehicle, an ordinary vehicle, a large vehicle, a pedestrian, a utility pole, and the like, to extract and use for automatic avoidance of obstacles. For example, the microcomputer 12051 distinguishes obstacles around the vehicle 12100 into obstacles that are visible to the driver of the vehicle 12100 and obstacles that are difficult to see. Then, the microcomputer 12051 can determine a collision risk indicating a risk of collision with each obstacle, and provide driving assistance for collision avoidance by outputting an alarm to the driver via the audio speaker 12061 or the display unit 12062, or by performing forced deceleration and avoidance steering via the drive system control unit 12010, when the collision risk is equal to or larger than a set value and there is a possibility of collision.

At least one of the imaging units 12101 to 12104 may be an infrared camera that detects infrared light. For example, the microcomputer 12051 can recognize a pedestrian by determining whether or not a pedestrian exists in a captured image of the imaging units 12101 to 12104. Such recognition of a pedestrian is performed by, for example, a procedure of extracting a feature point in a captured image of the imaging unit 12101 to 12104 as an infrared camera, and a procedure of performing pattern matching processing on a series of feature points indicating a contour of an object and determining whether or not the object is a pedestrian. When the microcomputer 12051 determines that a pedestrian is present in the image captured by the imaging units 12101 to 12104 and recognizes the pedestrian, the sound/image output unit 12052 controls the display unit 12062 so as to superimpose and display a rectangular contour line for emphasis on the recognized pedestrian. Furthermore, the sound/image output unit 12052 may control the display unit 12062 to display an icon or the like indicating a pedestrian at a desired position.

An example of the vehicle control system to which the technology according to the present disclosure can be applied has been described above. The technology according to the present disclosure can be applied to the imaging unit 12031 among the configurations described above. Specifically, the solid-state imaging device 10 can be applied to the imaging units 12101 to 12105. By applying the technology according to the present disclosure to the imaging unit 12031, for example, deterioration of phase difference information and deterioration of image quality can be suppressed.

Therefore, by improving the visibility, it is possible to more accurately recognize an object such as a person, a car, an obstacle, a sign, or a character on a road surface.

7. Application Example to Endoscopic Surgery System

Figure 23:
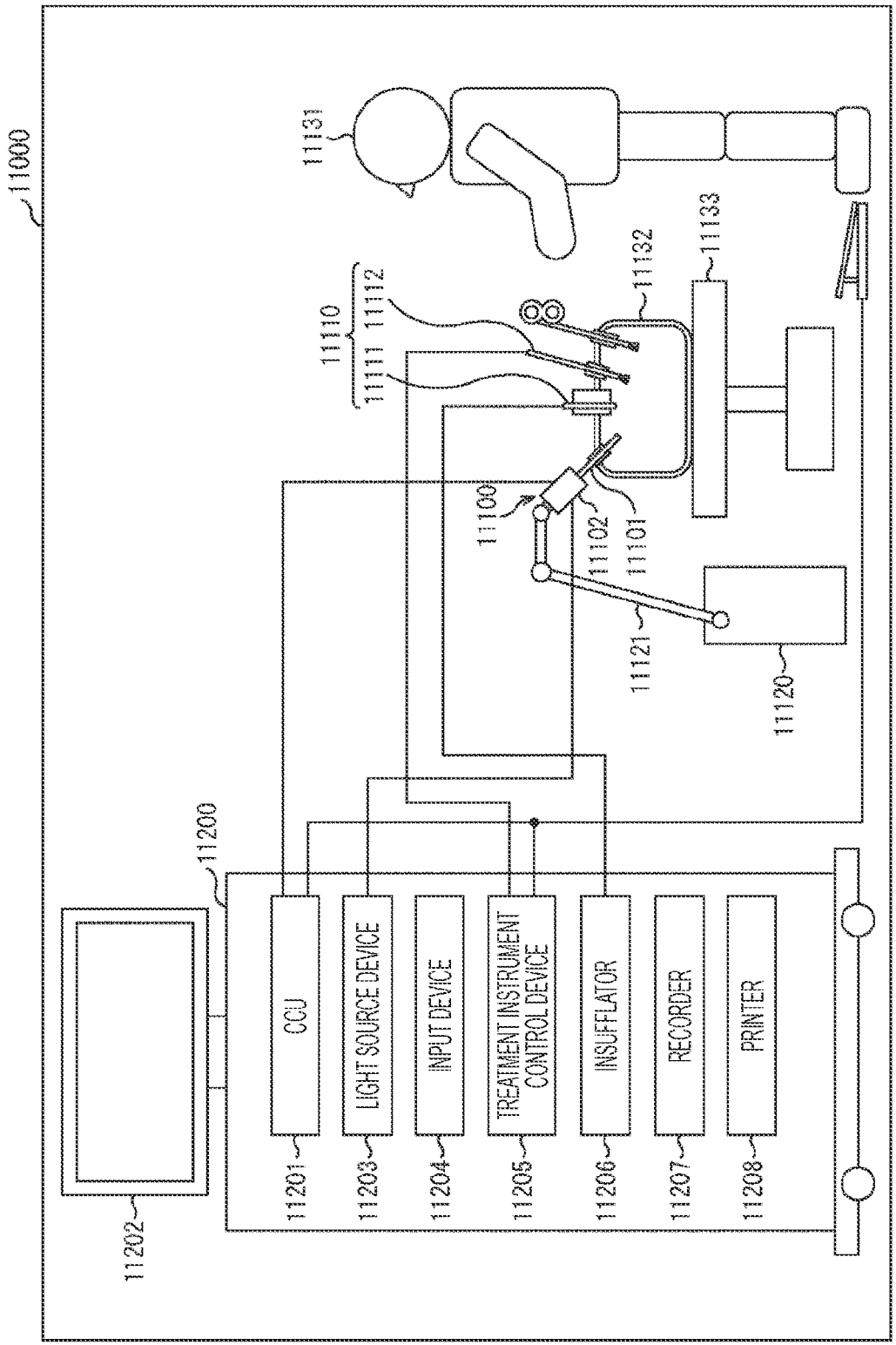
FIG. 23 is a view illustrating an example of a schematic configuration of an endoscopic surgery system.

FIG. 23 is a view illustrating an example of a schematic configuration of an endoscopic surgery system to which the technology (the present technology) according to the present disclosure can be applied.

FIG. 23 illustrates a state where an operator (a doctor) 11131 performs surgery on a patient 11132 on a patient bed 11133, by using an endoscopic surgery system 11000. As illustrated, the endoscopic surgery system 11000 includes: an endoscope 11100; other surgical instruments 11110 such as an insufflation tube 11111 and an energy treatment instrument 11112; a support arm device 11120 supporting the endoscope 11100; and a cart 11200 mounted with various devices for endoscopic surgery.

The endoscope 11100 includes a lens barrel 11101 whose region of a predetermined length from a distal end is inserted into a body cavity of the patient 11132, and a camera head 11102 connected to a proximal end of the lens barrel 11101. In the illustrated example, the endoscope 11100 configured as a so-called rigid endoscope having a rigid lens barrel 11101 is illustrated, but the endoscope 11100 may be configured as a so-called flexible endoscope having a flexible lens barrel.

At the distal end of the lens barrel 11101, an opening fitted with an objective lens is provided. The endoscope 11100 is connected with a light source device 11203, and light generated by the light source device 11203 is guided to the distal end of the lens barrel by a light guide extended inside the lens barrel 11101, and emitted toward an observation target in the body cavity of the patient 11132 through the objective lens. Note that the endoscope 11100 may be a forward-viewing endoscope, or may be an oblique-viewing endoscope or a side-viewing endoscope.

Inside the camera head 11102, an optical system and an imaging element are provided, and reflected light (observation light) from the observation target is condensed on the imaging element by the optical system. The observation light is photoelectrically converted by the imaging element, and an electric signal corresponding to the observation light, in other words, an image signal corresponding to an observation image is generated. The image signal is transmitted to a camera control unit (CCU) 11201 as RAW data.

The CCU 11201 is configured by a central processing unit (CPU), a graphics processing unit (GPU), and the like, and integrally controls action of the endoscope 11100 and a display device 11202. Moreover, the CCU 11201 receives an image signal from the camera head 11102, and applies, on the image signal, various types of image processing for displaying an image on the basis of the image signal, for example, development processing (demosaicing processing) and the like.

The display device 11202 displays an image on the basis of the image signal subjected to the image processing by the CCU 11201, under the control of the CCU 11201.

The light source device 11203 is configured by a light source such as a light emitting diode (LED), for example, and supplies irradiation light at a time of capturing an image of the operative site or the like to the endoscope 11100.

An input device 11204 is an input interface to the endoscopic surgery system 11000. A user can input various types of information and input instructions to the endoscopic surgery system 11000 via the input device 11204. For example, the user inputs an instruction or the like for changing imaging conditions (a type of irradiation light, a magnification, a focal length, and the like) by the endoscope 11100.

A treatment instrument control device 11205 controls driving of the energy treatment instrument 11112 for ablation of a tissue, incision, sealing of a blood vessel, or the like. An insufflator 11206 sends gas into a body cavity through the insufflation tube 11111 in order to inflate the body cavity of the patient 11132 for the purpose of securing a visual field by the endoscope 11100 and securing a working space of the operator. A recorder 11207 is a device capable of recording various types of information regarding the surgery. A printer 11208 is a device capable of printing various types of information regarding the surgery in various forms such as text, images, and graphs.

Note that the light source device 11203 that supplies the endoscope 11100 with irradiation light for capturing an image of the operative site may include, for example, a white light source configured by an LED, a laser light source, or a combination thereof. In a case where the white light source is configured by a combination of RGB laser light sources, since output intensity and output timing of each color (each wavelength) can be controlled with high precision, the light source device 11203 can adjust white balance of a captured image. Furthermore, in this case, it is also possible to capture an image corresponding to each of RGB in a time division manner by irradiating the observation target with laser light from each of the RGB laser light sources in a time-division manner, and controlling driving of the imaging element of the camera head 11102 in synchronization with the irradiation timing. According to this method, it is possible to obtain a color image without providing a color filter in the imaging element.

Furthermore, driving of the light source device 11203 may be controlled to change intensity of the light to be outputted at every predetermined time interval. By acquiring images in a time-division manner by controlling the driving of the imaging element of the camera head 11102 in synchronization with the timing of the change of the light intensity, and combining the images, it is possible to generate an image of a high dynamic range without so-called black defects and whiteout.

Furthermore, the light source device 11203 may be configured to be able to supply light having a predetermined wavelength band corresponding to special light observation. In the special light observation, for example, so-called narrow band imaging is performed in which predetermined tissues such as blood vessels in a mucous membrane surface layer are imaged with high contrast by utilizing wavelength dependency of light absorption in body tissues and irradiating the predetermined tissues with narrow band light as compared to the irradiation light (in other words, white light) at the time of normal observation. Alternatively, in the special light observation, fluorescence observation for obtaining an image by fluorescence generated by irradiation of excitation light may be performed. In the fluorescence observation, it is possible to perform irradiating a body tissue with excitation light and observing fluorescence from the body tissue (autofluorescence observation), locally injecting a reagent such as indocyanine green (ICG) into a body tissue and irradiating the body tissue with excitation light corresponding to the fluorescence wavelength of the reagent to obtain a fluorescent image, or the like. The light source device 11203 may be configured to be able to supply narrow band light and/or excitation light corresponding to such special light observation.

Figure 24:
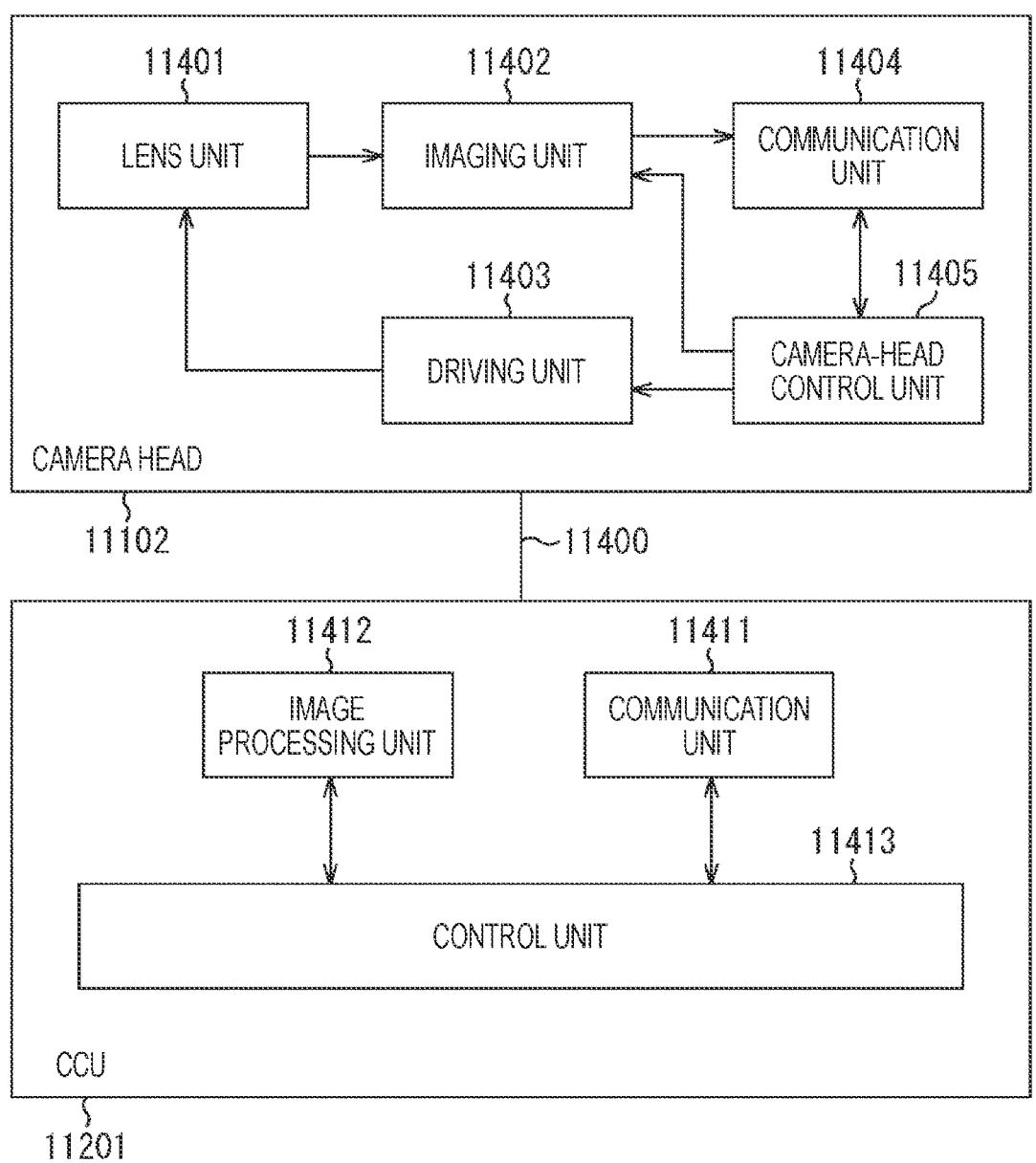
FIG. 24 is a block diagram illustrating an example of a functional configuration of a camera head and a CCU.

FIG. 24 is a block diagram illustrating an example of a functional configuration of the camera head 11102 and the CCU 11201 illustrated in FIG. 23.

The camera head 11102 has a lens unit 11401, an imaging unit 11402, a driving unit 11403, a communication unit 11404, and a camera-head control unit 11405. The CCU 11201 has a communication unit 11411, an image processing unit 11412, and a control unit 11413. The camera head 11102 and the CCU 11201 are communicably connected in both directions by a transmission cable 11400.

The lens unit 11401 is an optical system provided at a connection part with the lens barrel 11101. Observation light taken in from the distal end of the lens barrel 11101 is guided to the camera head 11102 and is incident on the lens unit 11401. The lens unit 11401 is configured by combining a plurality of lenses including a zoom lens and a focus lens.

The imaging unit 11402 includes an imaging element. The number of the imaging elements included in the imaging unit 11402 may be one (a so-called single plate type) or plural (a so-called multi-plate type). In a case where the imaging unit 11402 is configured with the multi-plate type, for example, individual imaging elements may generate image signals corresponding to RGB each, and a color image may be obtained by synthesizing them. Alternatively, the imaging unit 11402 may have a pair of imaging elements for respectively acquiring image signals for the right eye and the left eye corresponding to three-dimensional (3D) display. Performing 3D display enables the operator 11131 to more accurately grasp a depth of living tissues in the operative site. Note that, in a case where the imaging unit 11402 is configured as the multi-plate type, a plurality of systems of the lens unit 11401 may also be provided corresponding to individual imaging elements.

Furthermore, the imaging unit 11402 may not necessarily be provided in the camera head 11102. For example, the imaging unit 11402 may be provided inside the lens barrel 11101 immediately after the objective lens.

The driving unit 11403 is configured by an actuator, and moves the zoom lens and the focus lens of the lens unit 11401 along an optical axis by a predetermined distance under control from the camera-head control unit 11405. With this configuration, a magnification and focus of a captured image by the imaging unit 11402 may be appropriately adjusted.

The communication unit 11404 is configured by a communication device for exchange of various types of information between with the CCU 11201. The communication unit 11404 transmits an image signal obtained from the imaging unit 11402 to the CCU 11201 via the transmission cable 11400 as RAW data.

Furthermore, the communication unit 11404 receives a control signal for controlling driving of the camera head 11102 from the CCU 11201, and supplies to the camera-head control unit 11405. The control signal includes information regarding imaging conditions such as, for example, information of specifying a frame rate of a captured image, information of specifying an exposure value at the time of imaging, information of specifying a magnification and focus of a captured image, and/or the like.

Note that the imaging conditions described above such as a frame rate, an exposure value, magnification, and focus may be appropriately specified by the user, or may be automatically set by the control unit 11413 of the CCU 11201 on the basis of the acquired image signal. In the latter case, a so-called auto exposure (AE) function, auto focus (AF) function, and auto white balance (AWB) function are to be installed in the endoscope 11100.

The camera-head control unit 11405 controls driving of the camera head 11102 on the basis of the control signal from the CCU 11201 received via the communication unit 11404.

The communication unit 11411 is configured by a communication device for exchange of various types of information with the camera head 11102. The communication unit 11411 receives an image signal transmitted via the transmission cable 11400 from the camera head 11102.

Furthermore, the communication unit 11411 transmits, to the camera head 11102, a control signal for controlling driving of the camera head 11102. Image signals and control signals can be transmitted by telecommunication, optical communication, or the like.

The image processing unit 11412 performs various types of image processing on an image signal that is RAW data transmitted from the camera head 11102.

The control unit 11413 performs various types of control related to imaging of an operative site and the like by the endoscope 11100 and related to display of a captured image obtained by the imaging of the operative site and the like. For example, the control unit 11413 generates a control signal for controlling driving of the camera head 11102.

Furthermore, the control unit 11413 causes the display device 11202 to display a captured image in which the operative site or the like is shown, on the basis of the image signal subjected to the image processing by the image processing unit 11412. At this time, the control unit 11413 recognizes various objects in the captured image by using various image recognition techniques. For example, by detecting a shape, a color, and the like of an edge of the object included in the captured image, the control unit 11413 can recognize a surgical instrument such as forceps, a specific living site, bleeding, mist in using the energy treatment instrument 11112, and the like. When causing the display device 11202 to display the captured image, the control unit 11413 may use the recognition result to superimpose and display various types of surgery support information on the image of the operative site. By superimposing and displaying the surgical support information and presenting to the operator 11131, it becomes possible to reduce a burden on the operator 11131 and to allow the operator 11131 to reliably proceed with the surgery.

The transmission cable 11400 connecting the camera head 11102 and the CCU 11201 is an electric signal cable corresponding to communication of an electric signal, an optical fiber corresponding to optical communication, or a composite cable of these.

Here, in the illustrated example, communication is performed by wire communication using the transmission cable 11400, but communication between the camera head 11102 and the CCU 11201 may be performed wirelessly.

An example of the endoscopic surgery system to which the technology according to the present disclosure can be applied has been described above. The technology according to the present disclosure can be applied to the endoscope 11100 among the configurations described above. Specifically, the solid-state imaging device 10 can be applied to the imaging unit 11402 of the camera head 11102. By applying the technology according to the present disclosure to the imaging unit 11402, for example, deterioration of phase difference information and deterioration of image quality can be suppressed to obtain a clearer image of an operative site, so that the operator can reliably check the surgical site.

Note that, here, the endoscopic surgery system has been described as an example, but the technology according to the present disclosure may be applied to other, for example, a microscopic surgery system or the like.

Note that the embodiments of the technology according to the present disclosure are not limited to the above-described embodiments, and various modifications can be made without departing from the scope of the technology according to the present disclosure.

Furthermore, the technology according to the present disclosure can have the following configurations.

(1)

A solid-state imaging device including:
- a pixel array unit in which a plurality of pixels is two-dimensionally arrayed, in which
- the plurality of pixels includes a phase difference pixel for phase difference detection,
- the pixel array unit has an array pattern in which pixel units including neighboring pixels of a same color are regularly arrayed, and
- the phase difference pixel is partially not added when horizontal/vertical addition is performed on a pixel signal of a predetermined pixel in a horizontal direction and a pixel signal of a predetermined pixel in a vertical direction, in reading the plurality of pixels.

(2)

The solid-state imaging device according to (1), in which a density of phase difference pixels after the horizontal/vertical addition is a density that is same as or similar to, or lower than a density of phase difference pixels before the horizontal/vertical addition.

(3)

The solid-state imaging device according to (1) or (2), in which
- there is provided, in a horizontal direction, a plurality of selection control lines to select connection to a vertical signal line from a floating diffusion region formed for every plurality of pixel units in a vertical direction, and driving of the plurality of selection control lines is controlled at a time of the horizontal/vertical addition.

(4)

The solid-state imaging device according to any one of (1) to (3), in which
an exposure time of a pixel included in the pixel unit is adjusted for every pixel, and
in reading the plurality of pixels, a high dynamic range (HDR) signal is generated by synthesizing pixel signals that are obtained by the horizontal/vertical addition and have a same color and different exposure times.

(5)

The solid-state imaging device according to (4), in which
among the plurality of pixels, the phase difference pixels including any of a plurality of photoelectric conversion elements formed for one on-chip lens are adjacent pixels of a same color and are included in adjacent different pixel units.

(6)

The solid-state imaging device according to (5), in which
the pixel unit includes four pixels of 2×2,
the phase difference pixels include a first phase difference pixel and a second phase difference pixel, as two pixels of 2×1 included in pixel units adjacent to each other on left and right, respectively, and
the first phase difference pixel and the second phase difference pixel are adjusted to have a same exposure time.

(7)

The solid-state imaging device according to (4), in which
each of the phase difference pixels is configured as a light-shielded pixel.

(8)

The solid-state imaging device according to any one of (1) to (3), in which
in pixels included in the pixel unit, all pixels of a same color have a same exposure time, and
in reading the plurality of pixels, the horizontal/vertical addition is performed after addition of pixel signals of pixels of a same color included in the pixel unit.

(9)

The solid-state imaging device according to (8), in which
among the plurality of pixels, the phase difference pixels including any of a plurality of photoelectric conversion elements formed for one on-chip lens are adjacent pixels of a same color and are included in adjacent different pixel units.

(10)

The solid-state imaging device according to (9), in which
the pixel unit includes four pixels of 2×2, and
the phase difference pixels include a first phase difference pixel and a second phase difference pixel, as two pixels of 2×1 included in pixel units adjacent to each other on left and right, respectively.

(11)

The solid-state imaging device according to (8), in which
each of the phase difference pixels is configured as a light-shielded pixel.

(12)

The solid-state imaging device according to (3), in which
in the horizontal/vertical addition, pixel signals of predetermined two pixels in a horizontal direction and pixel signals of two pixels in a vertical direction are added, and
in the horizontal/vertical addition, driving of a plurality of selection control lines is controlled in such a way that a pixel signal of a phase difference pixel included in a specific pixel unit is selected and a pixel signal of a normal pixel included in other pixel units excluding the pixel unit is not added.

(13)

The solid-state imaging device according to (3) or (12), in which
in horizontal/vertical addition of adding pixel signals of predetermined two pixels in a horizontal direction and pixel signals of two pixels in a vertical direction, driving of a plurality of selection control lines is controlled in such a way that addition is not performed on a pixel signal of a pixel included in a pixel unit including a specific phase difference pixel and a pixel signal of a normal pixel included in a pixel unit diagonal to the pixel unit.

(14)

The solid-state imaging device according to (3), (12), or (13), in which
in horizontal/vertical addition of adding pixel signals of predetermined two pixels in a horizontal direction and pixel signals of two pixels in a vertical direction, driving of a plurality of selection control lines is controlled in such a way that a pixel signal of a pixel of a pixel unit including only a normal pixel is added.

(15)

The solid-state imaging device according to (3), (12), or (13), in which
a specific floating diffusion region is connected to a common vertical signal line, and
in the horizontal/vertical addition, driving of a plurality of selection control lines is controlled in order to read a pixel signal from the specific floating diffusion region.

(16)

The solid-state imaging device according to (15), in which
the specific floating diffusion region connected to the common vertical signal line is formed in different columns in a vertical direction, and
each of pixel units sharing the specific floating diffusion region is arranged in a same row in a horizontal direction and includes pixels of a same color.

(17)

A solid-state imaging device including:
a pixel array unit in which a plurality of pixels is two-dimensionally arrayed, in which
the plurality of pixels includes a phase difference pixel for phase difference detection,
the pixel array unit has an array pattern in which pixel units including neighboring pixels of a same color are regularly arrayed, and
there is provided, in a horizontal direction, a plurality of selection control lines to select connection to a vertical signal line from a floating diffusion region formed for every plurality of pixel units in a vertical direction.

(18)

The solid-state imaging device according to (17), in which
an exposure time of a pixel included in the pixel unit is adjusted for every pixel, and
in reading the plurality of pixels, an HDR signal is generated by synthesizing pixel signals that have a same color and different exposure times and are obtained by horizontal/vertical addition on a pixel signal of a predetermined pixel in a horizontal direction and a pixel signal of a predetermined pixel in a vertical direction.

(19)

The solid-state imaging device according to (17), in which
in pixels included in the pixel unit, all pixels of a same color have a same exposure time, and
in reading the plurality of pixels, after addition of pixel signals of pixels having a same color and included in the pixel unit, horizontal/vertical addition is performed on a pixel signal of a predetermined pixel in a horizontal direction and a pixel signal of a predetermined pixel in a vertical direction.

(20)

An electronic device equipped with a solid-state imaging device including:
a pixel array unit in which a plurality of pixels is two-dimensionally arrayed, in which
the plurality of pixels includes a phase difference pixel for phase difference detection,
the pixel array unit has an array pattern in which pixel units including neighboring pixels of a same color are regularly arrayed, and
the phase difference pixel is partially not added when horizontal/vertical addition is performed on a pixel signal of a predetermined pixel in a horizontal direction and a pixel signal of a predetermined pixel in a vertical direction, in reading the plurality of pixels.

REFERENCE SIGNS LIST

10 Solid-state imaging device
11 Pixel array unit
12 Vertical drive circuit
111 Floating diffusion region (FD)
121 Pixel drive line
122, 122-1, 122-2, 122-3 Selection control line
131 Vertical signal line (VSL)
100 Pixel
200, 200A, 200B Pixel unit
1000 Electronic device
1012 Imaging unit
1014 Control unit
1020 Driving unit
12031 Imaging unit
11402 Imaging unit

The invention claimed is:

1. A solid-state imaging device, comprising:
a pixel array unit in which a plurality of pixels is two-dimensionally arrayed,
wherein the plurality of pixels includes sets of phase difference pixels for phase difference detection, each of the sets including a respective first phase difference pixel and a respective second phase difference pixel adjacent to each other;
wherein the pixel array unit has an array pattern in which a plurality of pixel units, each of the pixel units including neighboring pixels of a same respective color, are regularly arrayed; and
wherein, in reading the plurality of pixels,
pixel signals of a first subset of the phase difference pixels are added in a first pattern of horizontal and vertical addition, and
pixel signals of a second subset of the phase difference pixels are discarded in a second pattern of the horizontal and vertical addition.

2. The solid-state imaging device according to claim 1, wherein
a density of the phase difference pixels after the horizontal and vertical addition is a density that is same as or lower than a density of the phase difference pixels before the horizontal and vertical addition.

3. The solid-state imaging device according to claim 1, wherein
there is provided, in a horizontal direction, a plurality of selection control lines to select connection to a vertical signal line from a floating diffusion region formed for every group of the pixel units in a vertical direction, and
driving of the plurality of selection control lines is controlled at a time of the horizontal and vertical addition.

4. The solid-state imaging device according to claim 1, wherein
an exposure time of a pixel included in an individual pixel unit is adjusted for every pixel, and
in reading the plurality of pixels, a high dynamic range (HDR) signal is generated by synthesizing pixel signals that are obtained by the horizontal and vertical addition and have a same color but different exposure times.

5. The solid-state imaging device according to claim 4, wherein
among the plurality of pixels, the respective first phase difference pixel and the respective second phase difference pixel are adjacent pixels of a same color included in adjacent different pixel units.

6. The solid-state imaging device according to claim 5, wherein
the individual pixel unit includes four pixels in a 2×2 arrangement, and
the respective first phase difference pixel and the respective second phase difference pixel are adjusted to have a same exposure time.

7. The solid-state imaging device according to claim 4, wherein
each of the phase difference pixels is configured as a light-shielded pixel.

8. The solid-state imaging device according to claim 1, wherein
in pixels included in an individual pixel unit, all pixels of the same respective color have a same exposure time, and
in reading the plurality of pixels, the horizontal and vertical addition is performed after addition of pixel signals of pixels of the same respective color included in the individual pixel unit.

9. The solid-state imaging device according to claim 8, wherein
among the plurality of pixels, the respective first phase difference pixel and the respective second phase difference pixel are adjacent pixels of a same color included in adjacent different pixel units.

10. The solid-state imaging device according to claim 9, wherein
the pixel unit includes four pixels in a 2×2 arrangement, and
the respective first phase difference pixel and the respective second phase difference pixel are adjusted to have a same exposure time.

11. The solid-state imaging device according to claim 8, wherein
each of the phase difference pixels is configured as a light-shielded pixel.

12. The solid-state imaging device according to claim 3, wherein
- in the horizontal and vertical addition, pixel signals of predetermined two pixels in a horizontal direction and pixel signals of two corresponding pixels in a vertical direction are added, and
- in the first pattern of the horizontal and vertical addition, driving of a plurality of selection control lines is controlled in such a way that a pixel signal of a phase difference pixel included in a specific pixel unit is selected, and a pixel signal of a normal pixel included in pixel units other than the specific pixel unit is not added.

13. The solid-state imaging device according to claim 12, wherein
- in the second pattern of the horizontal and vertical addition, driving of a plurality of selection control lines is controlled in such a way that addition is not performed on a pixel signal of a pixel included in a pixel unit that includes a specific phase difference pixel and a pixel signal of a normal pixel included in a pixel unit diagonal to the pixel unit that includes the specific phase difference pixel.

14. The solid-state imaging device according to claim 13, wherein
- in a third pattern of the horizontal and vertical addition, driving of a plurality of selection control lines is controlled in such a way that a pixel signal of a pixel of a pixel unit including only normal pixels is added.

15. The solid-state imaging device according to claim 3, wherein
- a specific floating diffusion region is connected to a common vertical signal line, and
- in the horizontal and vertical addition, driving of a plurality of selection control lines is controlled in order to read a pixel signal from the specific floating diffusion region.

16. The solid-state imaging device according to claim 15, wherein
- the specific floating diffusion region connected to the common vertical signal line is formed in different columns in the vertical direction, and
- each of pixel units sharing the specific floating diffusion region is arranged in a same row in the horizontal direction and includes pixels of a same color.

17. A solid-state imaging device comprising:
- a pixel array unit in which a plurality of pixels is two-dimensionally arrayed,
- wherein the plurality of pixels includes sets of phase difference pixels for phase difference detection, each of the sets including a respective first phase difference pixel and a respective second phase difference pixel adjacent to each other;
- wherein the pixel array unit has an array pattern in which a plurality of pixel units, each of the pixel units including neighboring pixels of a same respective color, are regularly arrayed;
- wherein there is provided, in a horizontal direction, a plurality of selection control lines to select connection to a vertical signal line from a floating diffusion region formed for every group of the pixel units in a vertical direction; and
- wherein driving of the plurality of selection control lines is controlled to enable at least a first pattern and a different second pattern of horizontal and vertical addition in reading the plurality of pixels.

18. The solid-state imaging device according to claim 17, wherein
- an exposure time of a pixel included in an individual pixel unit is adjusted for every pixel, and
- in reading the plurality of pixels, a high dynamic range (HDR) signal is generated by synthesizing pixel signals that have a same color but different exposure times and are obtained by the horizontal and vertical addition.

19. The solid-state imaging device according to claim 17, wherein in said reading the plurality of pixels,
- pixel signals of a first subset of the phase difference pixels are added in the first pattern of the horizontal and vertical addition, and
- pixel signals of a second subset of the phase difference pixels are discarded in the different second pattern of the horizontal and vertical addition.

20. An electronic device equipped with a solid-state imaging device, the solid-state imaging device comprising:
- a pixel array unit in which a plurality of pixels is two-dimensionally arrayed,
- wherein the plurality of pixels includes sets of phase difference pixels for phase difference detection, each of the sets including a respective first phase difference pixel and a respective second phase difference pixel adjacent to each other;
- wherein the pixel array unit has an array pattern in which a plurality of pixel units, each of the pixel units including neighboring pixels of a same respective color, are regularly arrayed; and
- wherein, in reading the plurality of pixels,
  - pixel signals of a first subset of the phase difference pixels are added in a first pattern of horizontal and vertical addition, and
  - pixel signals of a second subset of the phase difference pixels are discarded in a second pattern of the horizontal and vertical addition.

* * * * *